US010169443B2

(12) United States Patent
Beisiegel et al.

(10) Patent No.: US 10,169,443 B2
(45) Date of Patent: *Jan. 1, 2019

(54) AUTOMATIC LOG SENSOR TUNING

(71) Applicant: International Business Machines Corporation, Armonk, NY (US)

(72) Inventors: Michael Beisiegel, San Carlos, CA (US); Dinakaran Joseph, Apex, NC (US); Devaprasad K. Nadgir, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 58 days.

This patent is subject to a terminal disclaimer.

(21) Appl. No.: 15/212,598

(22) Filed: Jul. 18, 2016

(65) Prior Publication Data

US 2016/0330068 A1 Nov. 10, 2016

Related U.S. Application Data

(63) Continuation of application No. 14/307,752, filed on Jun. 18, 2014, now Pat. No. 9,449,072, which is a (Continued)

(51) Int. Cl.
*G06F 17/30* (2006.01)
*H04Q 9/00* (2006.01)
(Continued)

(52) U.S. Cl.
CPC .. *G06F 17/30598* (2013.01); *G06F 17/30306* (2013.01); *G06F 17/30864* (2013.01);
(Continued)

(58) Field of Classification Search
CPC ............. A61B 5/0024; G05B 23/0216; G05B 23/0221; G05B 23/0264; G06F 17/30;
(Continued)

(56) References Cited

U.S. PATENT DOCUMENTS 6,848,005 B1 1/2005 Plevyak et al.
7,228,564 B2 * 6/2007 Raikar ................ H04L 63/1408
726/11
(Continued)

FOREIGN PATENT DOCUMENTS

CN 102314561 A 1/2012
CN 102981943 A 3/2013
CN 104516807 A 4/2015

OTHER PUBLICATIONS

Beisiegel et al., "Chinese Office Action", dated Jan. 26, 2017, Foreign Application No. 201410504908.6, pp. 1-8.
(Continued)

*Primary Examiner* — Dennis Truong
(74) *Attorney, Agent, or Firm* — Peter J. Hackmann

(57) ABSTRACT

A process for automatic tuning a set of collectors and/or sensors includes: collecting first machine data by a first sensor in a collection framework, processing the first machine data by a first collector in the collection framework to yield first collected machine data, performing analytics on the first collected machine data to generate analytics output, and tuning, based, at least in part, on the analytics output, at least one of the following: the first sensor and the first collector.

20 Claims, 11 Drawing Sheets

Related U.S. Application Data continuation of application No. 14/038,918, filed on Sep. 27, 2013, now Pat. No. 9,507,847.

(51) Int. Cl.
*H04L 12/24* (2006.01)
*H04L 29/08* (2006.01)

(52) U.S. Cl.
CPC ............ *H04L 41/069* (2013.01); *H04L 67/02* (2013.01); *H04Q 9/00* (2013.01); *H04Q 2209/823* (2013.01)

(58) Field of Classification Search
CPC ......... G06F 17/30598; G06F 17/30306; G06F 17/30864; G06F 3/015; G06F 11/0778; G06F 11/0787; G06F 11/3072; G08B 25/009; G08B 29/188; G08B 21/12; H04L 41/0681; H04L 41/142; H04L 41/147; H04L 43/022; H04L 43/045; H04L 43/067; H04L 43/0876; H04L 47/127; H04L 41/069; H04L 67/02; H04W 24/08; H04W 24/10; H04Q 9/00; H04Q 2209/823
USPC ............. 707/648, 758; 709/224; 714/45, 48; 715/736

See application file for complete search history.

(56) References Cited

U.S. PATENT DOCUMENTS

| | | | |
|---|---|---|---|
| 7,251,584 B1 | 7/2007 | Perazolo et al. | |
| 7,653,633 B2 | 1/2010 | Villella et al. | |
| 8,086,596 B2 | 12/2011 | Bernardini et al. | |
| 9,449,072 B2 | 9/2016 | Beisiegel et al. | |
| 9,507,847 B2 | 11/2016 | Beisiegel et al. | |
| 2002/0032871 A1 | 3/2002 | Malan et al. | |
| 2002/0032880 A1 | 3/2002 | Poletto et al. | |
| 2002/0035683 A1 | 3/2002 | Kaashoek et al. | |
| 2002/0078382 A1 | 6/2002 | Sheikh et al. | |
| 2002/0198983 A1* | 12/2002 | Ullmann | G06F 11/0709 709/224 |
| 2004/0225689 A1 | 11/2004 | Dettinger et al. | |
| 2004/0236866 A1 | 11/2004 | Dugatkin et al. | |
| 2005/0039047 A1 | 2/2005 | Raikar et al. | |
| 2005/0086300 A1 | 4/2005 | Yeager et al. | |
| 2006/0120282 A1 | 6/2006 | Carlson et al. | |
| 2006/0152355 A1* | 7/2006 | Suenbuel | G08B 21/12 340/511 |
| 2006/0229931 A1 | 10/2006 | Fligler et al. | |
| 2006/0294221 A1 | 12/2006 | Graupner et al. | |
| 2007/0262863 A1 | 11/2007 | Aritsuka et al. | |
| 2008/0049013 A1 | 2/2008 | Nasle | |
| 2008/0065705 A1* | 3/2008 | Miller | G05B 21/02 |
| 2008/0082345 A1 | 4/2008 | Greiner et al. | |
| 2009/0052329 A1 | 2/2009 | Mahajan et al. | |
| 2009/0207749 A1* | 8/2009 | Roskowski | H04L 41/0681 370/252 |
| 2010/0031156 A1* | 2/2010 | Doyle | H04L 41/142 715/736 |
| 2010/0054151 A1 | 3/2010 | Droz et al. | |
| 2011/0019566 A1 | 1/2011 | Leemet et al. | |
| 2011/0035242 A1 | 2/2011 | Sondhi et al. | |
| 2011/0143811 A1 | 6/2011 | Rodriguez | |
| 2011/0219208 A1 | 9/2011 | Asaad et al. | |
| 2011/0246826 A1 | 10/2011 | Hsieh et al. | |
| 2011/0320884 A1* | 12/2011 | Thilagar | G06F 11/0709 714/48 |
| 2012/0075450 A1 | 3/2012 | Ding et al. | |
| 2012/0117016 A1 | 5/2012 | Freese et al. | |
| 2012/0137101 A1 | 5/2012 | Arcese et al. | |
| 2012/0331038 A1* | 12/2012 | Yang | G06F 9/54 709/203 |
| 2013/0086429 A1 | 4/2013 | Ng | |
| 2014/0047106 A1 | 2/2014 | Leung et al. | |
| 2014/0279918 A1* | 9/2014 | Han | G06F 11/366 707/648 |
| 2015/0094990 A1 | 4/2015 | Beisiegel et al. | |
| 2015/0095332 A1 | 4/2015 | Beisiegel et al. | |
| 2015/0199010 A1* | 7/2015 | Coleman | A61B 5/0006 345/156 |

OTHER PUBLICATIONS

Bodo et al., "Harvesting Logs and Events Using MetaCentrum Virtualization Services", Konference EurOpen.CZ, pp. 55-71, 12.-15. kvetna 2013, ISBN 978-80-86583-25-9.

Herodotou et al., "Starfish: A Self-tuning System for big Data Analytics", pp. 261-272, 5th Biennial Conference on Innovative Data Systems Research (CIDR '11), Jan. 9-12, 2011, Asilomar, California, USA.

Herodotou, Herodotos, "Automatic Tuning of Data-Intensive Analytical Workloads", Department of Computer Science, Dissertation submitted in partial fulfillment of the requirements for the degree of Doctor of Philosophy in the Department of Computer Science in the Graduate School of Duke University 2012, pp. i-265.

"Autonomic computing"—Wikipedia, the free encyclopedia, page last modified on May 7, 2013 at 23:11, <https://en.wikipedia.org/wiki/Autonomic_computing>.

"Cluster analysis"—Wikipedia, the free encyclopedia, page last modified on Aug. 18, 2013 at 14:14, <http://en.wikipedia.org/w/index.php?title=Cluster_analysis&oldid=569083933>.

"Log analysis"—Wikipedia, the free encyclopedia, page last modified on Jun. 10, 2013 at 20:04, <http://en.wikipedia.org/wiki/Log_analysis>.

* cited by examiner

AUTOMATIC LOG SENSOR TUNING

FIELD OF THE INVENTION

The present invention relates to how the data from different resources are tuned and collected for search clusters for further analytics.

BACKGROUND OF THE INVENTION

In computer log management and intelligence, log analysis (or system and network log analysis) is a set of techniques for providing insight into computer-generated records (also called log or audit trail records). The process of creating such records is called data logging. People do log analysis for reasons including the following: (i) compliance with security policies; (ii) compliance with audits; (iii) system troubleshooting; (iv) forensics; and/or (v) security incident response. Logs are emitted by network devices, operating systems, applications and other programmable devices. A stream of messages in time-sequence may constitute a log. Logs are sometimes directed to files and stored on disk, or directed as a "network stream" to a log collector. Log messages: (i) are interpreted with respect to the internal state of its source (for example, an application); and (ii) announce security-relevant or operations-relevant events (for example, a systems error). Logs are often created by software developers to aid in the debugging of the operation of a software application. Log analysis interprets messages in the context of an application, vendor, system or configuration (each of which may have its own form and format for generating logs) in order to make useful comparisons among and between messages from different log sources.

Some logging related functions include: (i) pattern recognition is a function of selecting incoming messages and comparing them with a pattern book in order to filter or handle in different ways; (ii) normalization is the function of converting message parts to the same format (e.g. common date format or normalized IP address); (iii) classification and tagging is ordering messages in different classes or tagging them with different keywords for later usage (e.g. filtering or display); and (iv) correlation analysis is a technology of collecting messages from different systems and finding all the messages that belong to one single event (e.g. messages generated by malicious activity on different systems: network devices, firewalls, servers, etc.).

Debugging logs are created by many components of an enterprise including: (i) systems; (ii) switches; (iii) networks; and (iv) software. In a typical log analysis environment, the logs emitted from each of the components of the enterprise are synced to a central search cluster. This collection of debugging logs is performed by programs called "sensors." Sensors collect machine data from certain enterprise components. Collectors are deployed by an enterprise to collect, aggregate, augment, and/or distribute machine data, including logs, mobile transactions, and/or other files from multiple sensors. A collector may delegate, or fail over, to another collector when it is unavailable. Cluster analysis (commonly called "clustering") is the task of grouping a set of objects in such a way that objects in the same group (called a "cluster") are more similar to each other than to those in other groups (clusters). A debugging search cluster is the group of objects associated with an abnormal system condition.

A collection framework manages the sensors to take actions based on the collected data from various sources. For example, a collection framework operates to sync collected data to a corresponding debugging search cluster.

SUMMARY

A method is presented that includes: responsive to an occurrence of an alert condition, generating a piped HTTP request for performing analytics on a first set of machine data in a search cluster, the first set of machine data collected by a collector according to a first configuration of the collector, receiving a single-threaded, piped HTTP response to the piped HTTP request as analytics output, determining a second configuration for the collector to collect a second set of machine data responsive to the analytics output, executing a sync instruction to the collector to replace the first configuration with the second configuration, causing the collector to collect a second set of machine data by processing new machine data according to the second configuration, the new machine data generated after the occurrence of the alert condition. The second set of machine data includes event-specific data determined to be relevant by performing analytics on the first set of machine data.

DETAILED DESCRIPTION

Figure 1:
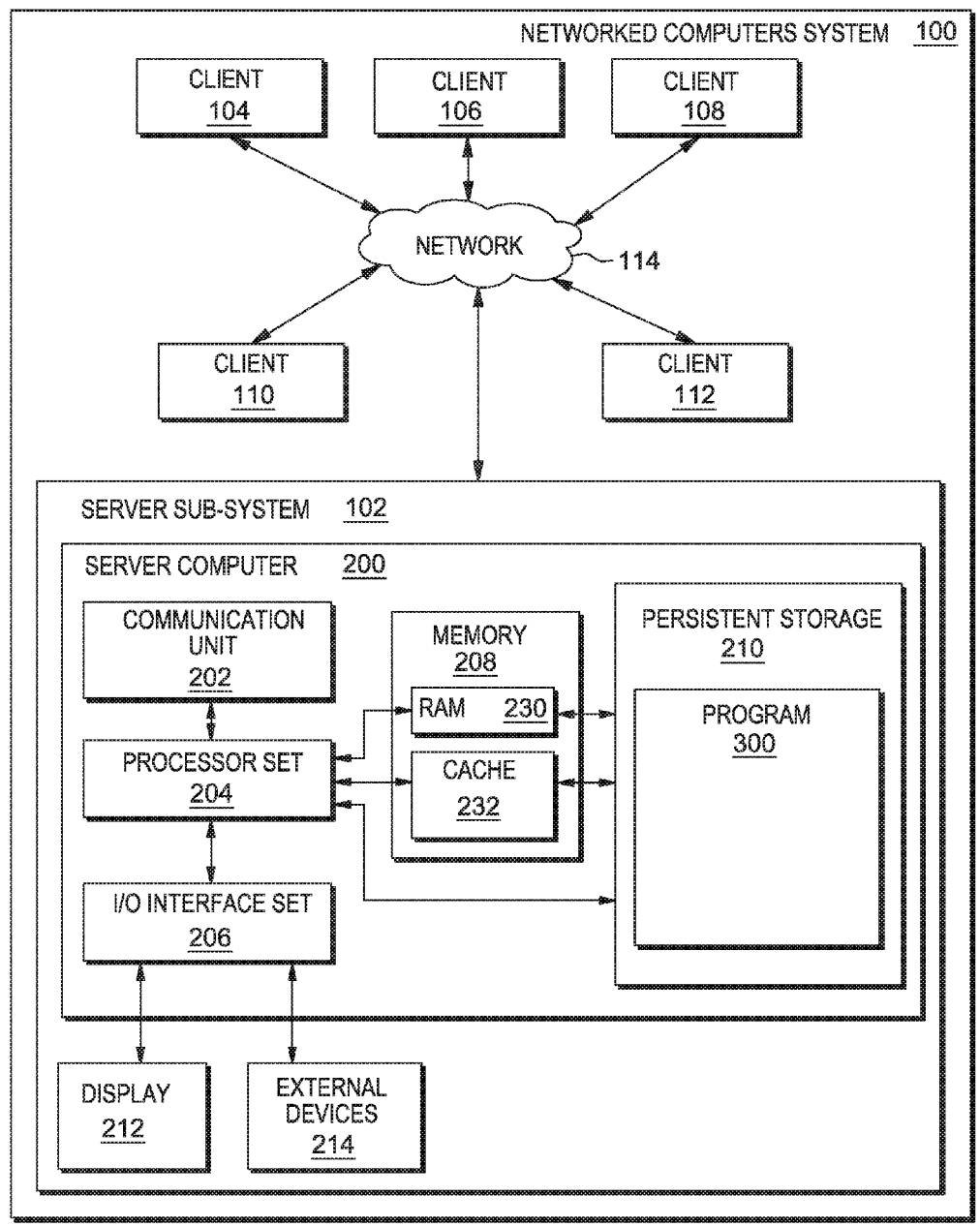
FIG. 1 is a schematic view of a first embodiment of a networked computers system according to the present invention.

This Detailed Description section is divided into the following sub-sections: (i) The Hardware and Software Environment; (ii) First Embodiment; (iii) Further Comments and/or Embodiments; and (iv) Definitions.

I. The Hardware and Software Environment

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java (note: the term(s) "Java" may be subject to trademark rights in various jurisdictions throughout the world and are used here only in reference to the products or services properly denominated by the marks to the extent that such trademark rights may exist), Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

An embodiment of a possible hardware and software environment for software and/or methods according to the present invention will now be described in detail with reference to the Figures. FIG. 1 is a functional block diagram illustrating various portions of networked computers system 100, including: server computer sub-system 102; client computer sub-systems 104, 106, 108, 110, 112; communication network 114; server computer 200; communication unit 202; processor set 204; input/output (i/o) interface set 206; memory device 208; persistent storage device 210; display device 212; external device set 214; random access memory (RAM) devices 230; cache memory device 232; and program 300.

Server computer sub-system 102 is, in many respects, representative of the various computer sub-system(s) in the present invention. Accordingly, several portions of computer sub-system 102 will now be discussed in the following paragraphs.

Server computer sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail, below, in the First Embodiment sub-section of this Detailed Description section.

Server computer sub-system 102 is capable of communicating with other computer sub-systems via network 114 (see FIG. 1). Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

It should be appreciated that FIG. 1 provides only an illustration of one implementation (that is, system 100) and does not imply any limitations with regard to the environments in which different embodiments may be implemented. Many modifications to the depicted environment may be made, especially with respect to current and anticipated future advances in cloud computing, distributed computing, smaller computing devices, network communications and the like.

Server computer sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the device on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102, such as client sub-systems 104, 106, 108, 110, 112. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

II. First Embodiment

Preliminary note: The flowchart and block diagrams in the following Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 2:
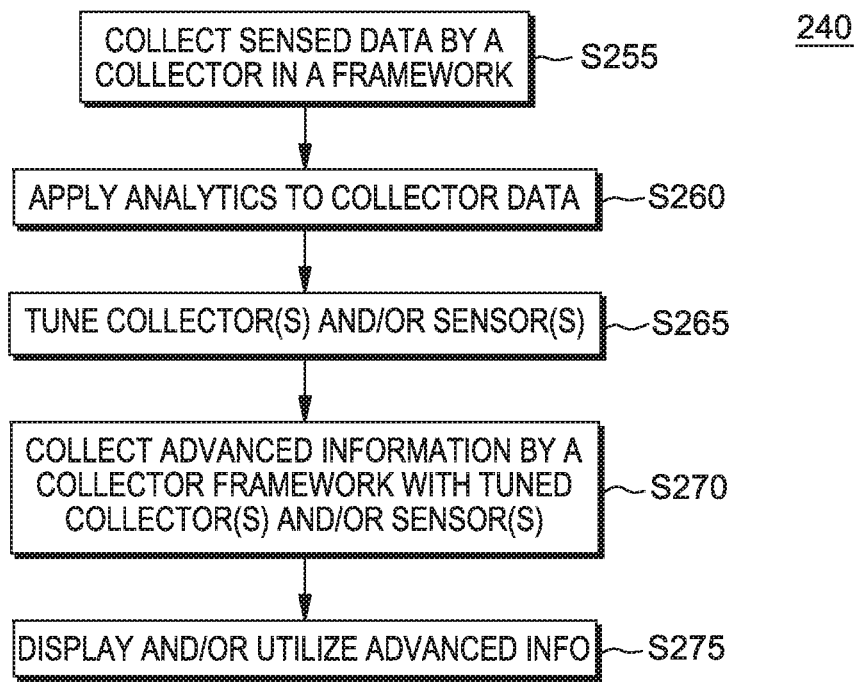
FIG. 2 is a flowchart showing a first method performed, at least in part, by the first embodiment networked computers system.
Figure 3:
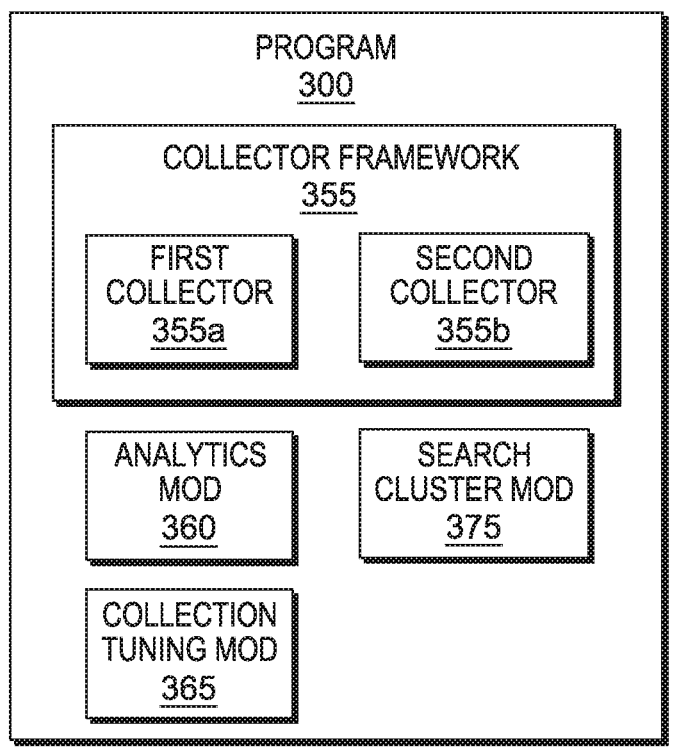
FIG. 3 is a schematic view of a portion of the first embodiment networked computers system.

FIG. 2 shows a flow chart 240 depicting a method according to the present invention. FIG. 3 shows program 300 for performing at least some of the method steps of flow chart 240. This method and associated software will now be discussed, over the course of the following paragraphs, with extensive reference to FIG. 2 (for the method step blocks) and FIG. 3 (for the software blocks).

Processing begins at step S255, where collector framework 355 including first collector 355a and second collector 355b collects sensed data. The term "sensed data," as used herein, is machine data received, or sensed, by the sensors in the collector framework. In the present embodiment, an error report prompts collector 355a in the collector framework to collect sensed data. The collection of "sensed data" is performed by the collectors in the collector framework. Machine data collected by a collector is herein referred to as "collector data." Both "sensed data" and "collector data" are herein referred to as "collected data." Alternatively, sensed data is collected periodically, or it is collected continuously. In some embodiments, the collectors operate on an initial setting where all sensed data is collected. Alternatively, only certain designated sensed data is collected by the collectors. Sensed data includes: (i) usage data; (ii) output data; (iii) debug logs; (iv) application logs; (v) mobile transactions; and (vi) other machine data files. In this embodiment of the present disclosure, collector data is stored as a distributed search cluster(s). In one embodiment of the present disclosure, the collector framework syncs the collector data to various distributed search clusters. Alternatively, collector data is stored as a data set in persistent storage 210. Alternatively, collector data is stored in any non-volatile computer readable storage media.

Processing proceeds to step S260, where analytics module 360 applies analytics to the distributed search cluster(s) to determine a sensor tuning action(s) as part of an enhanced data acquisition strategy. In this embodiment, an alert condition prompts transfer of the collector data from step S255 to the analytics module. Alternatively, the analytics module receives collector data based on: (i) timing; (ii) stored memory size; and/or (iii) upon demand of a user. In this embodiment, the analytics engine learns, or acquires knowledge, about what tuning actions to take in response to a given alert condition. Alternatively, the collector and/or sensor is tuned to better respond to alert conditions as they arise.

In the present embodiment, the analytics is based on a pipes programming model. A discussion of analytic pipes and an example analytics platform is found below in section IV of this detailed description. Alternatively, other types of data analysis provide additional support to the analytic engine for determining a sensor tuning action. Other analysis methods include: (i) trend analysis; and (ii) application of pre-defined algorithms to certain conditions identified by collected data.

The operation of the analytics module as described herein may be performed in real time to allow prompt visualization of complex data searches, data manipulation, and analytical data visualization. For purposes of the present description, real time shall include any time frame of sufficiently short duration as to provide reasonable response time for information processing acceptable to a user of the subject matter described. Additionally, the term "real time" shall include what is commonly termed "near real time"—generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art.

Processing proceeds to step S265, where collection tuning module 365 takes tuning action(s) to tune collectors and/or sensors according to analytics input. The initial tuning of the collectors and/or sensors is performed by way of configuring the sensors and collectors that the collector framework is working with. Accordingly, as an initial step, there is no change to the collection of machine data. The collection of certain types of data being sensed changes based on the type of error reported within the network or computer system. This change in data collection is driven by the analytics engine, which understands that a certain type of error has occurred, or is about to occur, and instructs the collector framework for tuning.

In the collector framework, collectors are one level above sensors. A collector collects, aggregates, augments, and/or distributes sensed data as-received by the collector. Tuning actions include: (i) increasing the logging activity; (ii) configuring the collector; and/or (iii) filtering the sensed data as-received at the collector layer. In this embodiment, collector tuning actions are implemented through sync level changes in response to sync instructions from the analytics platform in the collector framework. Alternatively, Tuning actions are implemented through the software application in question. Tuning actions are taken so that advanced information is collected in addition to, or instead of, the initial data collection setting.

Processing proceeds to step S270, where search cluster module 375 collects advanced information through the collection framework having tuned sensors and/or collectors. Advanced information collected in response to the analytic engine's tuning actions may include: (i) device-specific data; (ii) source-specific data; (iii) native logs; (iv) an optimally selected type of data; (v) development API logs; (vi) additional information; (vii) contextual information; and/or (viii) relevant data.

The decision to take a tuning action is made by collection tuning module 365 in response to analytic engine output. Because of this arrangement, the sensors and/or collectors of a collector framework make up a dump endpoint without having to decide for themselves what to do when a similar situation is detected. It is the analytics engine that has algorithms to search out and find an anomaly that needs tuning. Each time a particular condition is identified by applying analytical routines, the sensors and/or collectors in the collector framework have to be tuned.

The sensors and collectors return to a default configuration tuning once sufficient advanced information is collected. In this embodiment, the return to default tuning is based on a predetermined time period. Alternatively, once the analytics engine has received a threshold amount of advanced information, tuning reverts back to a default configuration.

Processing proceeds to step S275, where search cluster module 375 prepares the advanced information for display and/or use. In some embodiments, advanced information is provided to an analytics engine for further analysis so that a solution can be generated. Alternatively, an advanced information report is produced that includes: (i) advanced information; and/or (ii) sensed data. The discussion that follows provides further details regarding the implementation and example uses of a collection framework to automatically tune sensors.

III. Further Comments and/or Embodiments

Figure 4:
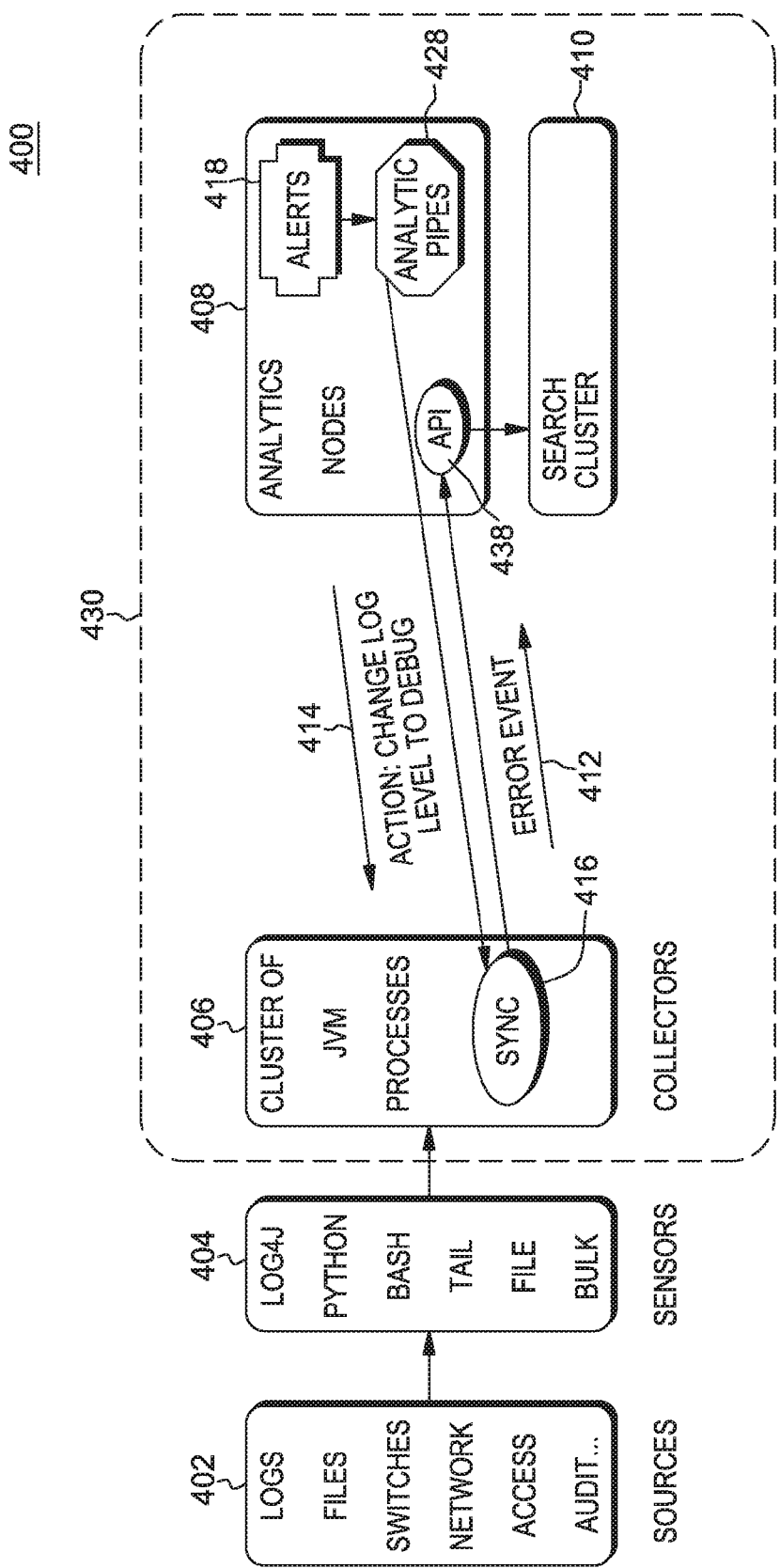
FIG. 4 is a block diagram of a first embodiment of a log analytics system according to the present invention.

As shown in FIG. 4, some embodiments of the present invention use a log analytics data collection framework 400, which will be further discussed below. Some embodiments of the present disclosure relate to how the data from different log resources are tuned and collected for search clusters for further analytics.

Some embodiments of the present disclosure recognize that a collection framework manages sensors to effectively take actions for the sensed data, such as syncing collected data to a search cluster.

Some embodiments of the present disclosure recognize that the collection framework is vital to a log analytics platform since there could be a failure in the collection frameworks or sensors in which a cluster of collection frameworks work together to process information from different types of data generating entities call sources.

Some embodiments of the present disclosure recognize that for log analytics systems, the data captured is key. However, the costs associated with: (i) storing the collected data; and (ii) computing power required to store, index, and provide searchable entries for the data collected drive efficient data collection techniques.

Some embodiments of the present disclosure provide very efficient data collection through a process where only relevant data is collected and indexed for further analysis or application of analytics.

Some embodiments of the present disclosure recognize that problems with current sensing and collecting frameworks include: (i) no ability to analyze the status of the health of the overall solution; and (ii) no ability to tune the sensors to optimally select the type of data that is collected.

For example, a computer program gateway identifies that there is a timeout on a service, but the service endpoints only collect errors and warnings from all service endpoints. At the time of the failure, if there were some amount of information indicating that an error occurred in the backend database to cause the timeout on the service, no information would be available on the related components that actually triggered this database to fail. Information that would be helpful, for example, would be the specific query from the application that caused the database to fail.

Some embodiments of the present disclosure provide an advanced way to tune the sensors of the collection framework through quickly applying analytics of the sensed data in real time. The assessment of the resultant analytics component execution support tuning the sensors to collect various types of advanced information.

Some embodiments of the present disclosure enable an analytics platform to execute continuous analytical scripts, or methods, to assess for interesting new events to occcur. In some embodiments, the implementation of the scripts is in the form of alerts in the analytics platform. For example, an alert could be monitoring for "error" or "warning" events for specific servers. An alert query represents whether such a situation occurred within the analytics platform or not. When a configured alert is identified, a scripted feedback is sent through the collector framework to automatically tune the data that is being captured from specified sources.

The initial tuning is more of a configuration of the sensors that the collector framework is working with. So, as an initial step, no sensed data or logs change. The collection of certain types of data being sensed changes base on the type of error or a system condition reported. This change is driven by the analytics engine that understands that a certain type of system condition (errors, hang, warning, timeouts, etc.) has occurred or is about to occur and instructs the collector framework for tuning instructions.

FIG. 4 is a block diagram of log analytics system 400 according to an embodiment of the present invention. The log analytics system includes: source module 402; sensor module 404; log analytics platform 430; collector module 406; collector sync sub-module 416; analytics nodes module 408; alerts sub-module 418; analytic pipes sub-module 428; indexing API sub-module 438; search cluster store 410; error event alert 412; and alter action 414.

Alerts are configured to monitor if there were any errors on specific hostnames. An alert query looks like this:
Severity:Error AND Hostname:production*

In log analytics system 400, the default setting of the collector framework is to only capture errors and warnings from all the production servers. Error event 412 is thrown by the production application server on Hostname=production019. This triggers alert action 414 to run an analytic script that evaluates the need for tuning all logs to Logger.DEBUG level for the next one hour so that the list of events are monitored on all production servers. The alert action for this example is shown below:
Sensor_Production019 log_level=Logger.DEBUG The decision to change the logger level to debug is made by analytic pipes 428 executing a script that runs various search algorithms to identify that there is a need for changing to the debug level to further assess the situation. Accordingly, the type(s) of data collected into a search-based analytics platform is changed dynamically by executing analytics pipes or scripts that determine the actions to be taken based on a situation that is identified through an alert.

These actions are sent back to collector sync 416 as a response to the indexing API request through analytics platform 430.

Some embodiments of the present disclosure may have one or more of the following advantages: (i) storing only relevant data; (ii) storing only data from particular servers; (iii) storing only data from relevant servers; (iv) storing only data from particular logs; (v) storing only data from relevant logs; (vi) providing searchable data from particular servers; (vii) providing searchable data from relevant servers; (viii) providing searchable data from particular logs; (ix) providing searchable data from relevant logs; (x) determining that a situation exists where default collection levels are not adequate; (xi) determining what additional information should be collected for an identified situation; (xii) tuning the client side sensing to provide additional information for an identified situation; (xiii) determining what contextual information should be collected for an identified situation; (xiv) tuning the client side sensing to provide contextual information for an identified situation; (xv) efficiently execute analytic content for incoming data; and (xvi) executing analytic content quickly to capture transient data at the time an error occurs.

Figure 5:
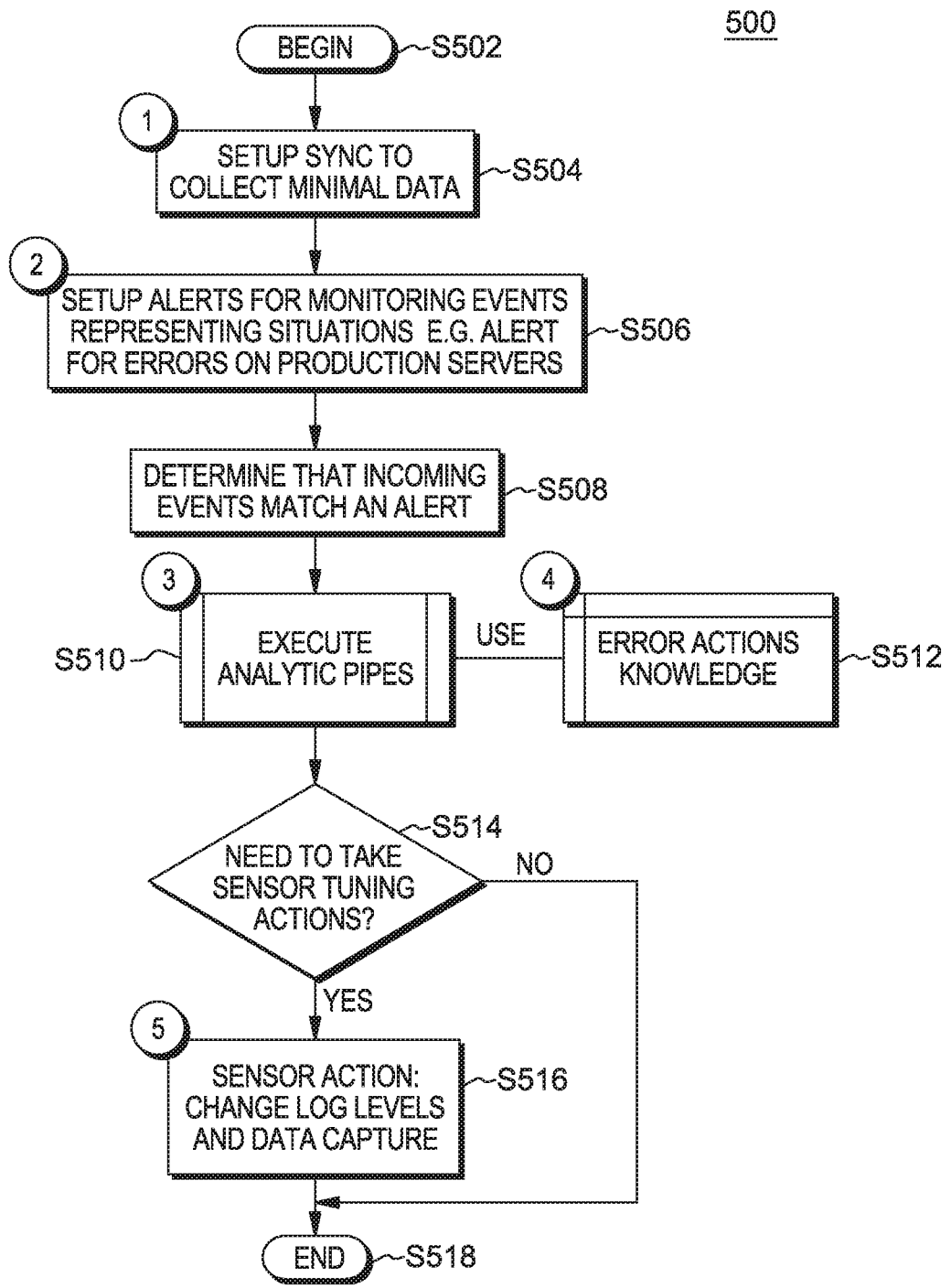
FIG. 5 is a flowchart showing a second method performed, at least in part, by the first embodiment log analytics system.

FIG. 5 is a flow chart of process 500 events that enable automatic alert-based tuning of collection of logs and data according to an embodiment of the present disclosure. Process 500 includes steps taken to automatically tune the sensor levels using alert-based execution of analytic pipes.

Processing begins at step S502 and continues to Step S504, where the collector sync collects minimal data to identify alert situations.

Processing proceeds to step S506, where alerts are set up for monitoring events within the collected data. An example of an alert is an alert for errors on production servers.

Processing proceeds to step S508, where collected data includes an incoming event that matches an alert situation.

Processing proceeds to step S510, where the analytics engine, such as analytic pipes, processes the collected data.

Processing proceeds to step S512, where analytic engine processes the collected data in light of error actions knowledge.

Processing proceeds to step S514, where a determination is made by the analytics engine as to whether sensor tuning actions are to be taken. Where no action is to be taken, processing ends.

Where a sensor tuning action is to be taken, processing proceeds to step S516, where a sensor tuning action is taken. Sensor tuning actions include: (i) changing log levels; (ii) changing data capture scope; (iii) tuning the client side sensing to provide additional information for an identified situation; and (iv) tuning the client side sensing to provide contextual information for an identified situation.

Processing ends at step S518.

Some embodiments of the present disclosure can be implemented using an analytics platform and collection frameworks such as Flume. (Note: the term(s) "Flume" may be subject to trademark rights in various jurisdictions throughout the world and are used here only in reference to the products or services properly denominated by the marks to the extent that such trademark rights may exist.) Some embodiments of the present disclosure execute steps S504 and S516 as Sync Code in Flume. Further, some embodiments using an analytics platform process steps S506, S510, and S512 as an inherent part of that platform.

The following use cases introduce scenarios where some embodiments of the present disclosure may be applied.

The first use case is a banking gateway scenario, where a gateway stores different types of logs. These logs are generally provided at a gateway level or a domain level by the gateway appliance.

When a business transaction fails, customers typically want all the information about the business transaction logged into a persistent store that is searchable for a variety of support personnel. Storing all of the business transaction data flowing through different systems is not a viable solution for the bank. Accordingly, a solution to explore different levels of automatic tuning of domain-specific logs and gateway-specific logs will be of great value from a gateway analytics perspective.

The second use case is a mobile device scenario, where an off-the-shelf analytics platform stores all device-specific information using a specialized mobile platform. For example an application developer's application fails on a specific OS (operating system) version on a specific device, such as an Android v4.1 on Nexus. (Note: the term(s) "Android" and/or "Nexus" may be subject to trademark rights in various jurisdictions throughout the world and are used here only in reference to the products or services properly denominated by the marks to the extent that such trademark rights may exist.) The analytic content of the log analytics platform can identify this type of failure and tune the client libraries specific to Nexus devices on all versions so that the applications developer gets enough information to identify the root cause of the problem.

Some embodiments of the present disclosure disclose a method and apparatus where analytical content is executed to change the data collection set by the sensors.

Some embodiments of the present disclosure disclose a method by which a situation is identified to trigger analytic content for execution to modify sensor data collection levels.

Some embodiments of the present disclosure disclose a framework by which data collection levels are automatically changed based on the action set by an analytical content or pipe. A pipe is a sequential program that is written typically in a scripting language like python, which can search, modify/assess and visualize data stored in distributed search clusters. (Note: the term(s) "python" may be subject to trademark rights in various jurisdictions throughout the world and are used here only in reference to the products or services properly denominated by the marks to the extent that such trademark rights may exist.)

Some embodiments of the present disclosure deal with a tuned acquisition of big data into a big data analytics engine for more efficient: (i) storing; (ii) indexing; (iii) processing; and (iv) analyzing of massive amounts of data being stored in distributed search clusters.

Some embodiments of the present disclosure recognize that oftentimes there are different types of data being thrown to a big data analytics engine to index and store. This data is analyzed periodically in most cases to analyze different situations and insights.

Some embodiments of the present disclosure are able to synchronize and efficiently control the amount of data that is collected. This collection of data (also referred as data acquisition) is illustrated in FIG. 6.

Figure 6:
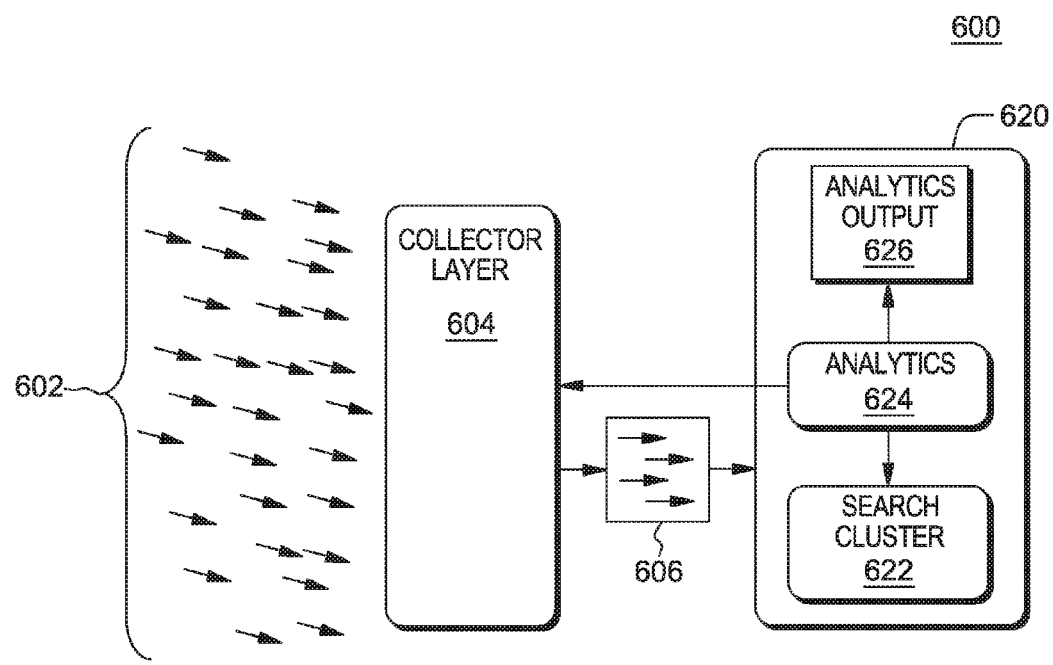
FIG. 6 is a block diagram of a second embodiment of a log analytics system according to the present invention.

FIG. 6 is a block diagram of log analytics platform 600 according to one embodiment of the present disclosure. The log analytics platform includes: events data source 602; collector layer 604; filtered events data 606; analytics engine 620; search cluster store 622; analytic pipes 624; and analytics output data 626.

The plethora of events 602 is noise for distributed big data analytics engine 620. Some embodiments of the present disclosure provide for highly efficient analytics content execution by: (i) filtering the right content acquisition to collect filtered events data 606; (ii) applying analytic content to the filtered events data to gain insights and/or visualization through: (a) prescriptive analytics; (b) descriptive analytics; and (c) predictive analytics; and (iii) enhancing analytics content execution by tuning the data acquisition quality through returning to collector layer 604: (a) tuning instructions; (b) configuration instructions; and (c) filtering options. The tuned data is collected to derive better analytic solutions.

Some embodiments of the present disclosure provide for enhanced data acquisition strategy by executing analytical content in big data analytics engines.

Some embodiments of the present disclosure achieve advanced optimization in analytics by looking at minimal data sets and enhancing the data acquisition for additional and relevant data based on the output of an initial analysis.

Architecture in which the overall performance of the big data analytics engine is optimized and enhanced by a tuning and configuration strategy for data collectors based on the results and findings of the analytics content.

Some embodiments of the present disclosure recognize the value in bringing automated big data analytics into the field of collecting log data where collectors and syncs describe the way data is collected and automatically fed into analytical execution components (known as pipes).

Each collection level from a collector point of view may have a pre-defined data set to be collected. For example, in the case of a mobile application that is not functioning correctly for a particular operating system or device type, some embodiments of the present disclosure collect: (i) native logs; (ii) development API logs; and (iii) application logs to form the complete data set. Some embodiments of the present disclosure perform automated big-data analytics before such data set collection instructions are given to the collector.

Some embodiments of the present disclosure set collection levels through sync level changes. This is done upon each execution of analytics pipes, which: (i) performs a search across big data; (ii) arrives at a logical result; and (iii) executes a sync instruction for collectors to change the data set it should collect.

An increase in logging activity is one type of change instruction for data collection. However, the collector layer that handles the data that is already being captured by the sensors without changing the existing behavior of the running software program.

Some embodiments of the present disclosure use a collector framework, or framework including a collector layer, as the next level of data set collection on top of agents, sensors, etc. A collector in the collector framework works with multiple agents. The collector framework is built as the next level of data collector across multiple agents and provides sync capability to different data storage APIs. A collector introduces architectural advantages including, but not limited to: (i) buffering; (ii) fail over; (iii) support for different formats of data; and (iv) support for multiple data syncs. Commercial examples of collector layers, which are emerging in popularity, include Scribe, Kafka, Flume, and Loggregator. (Note: the term(s) "Scribe," "Kafka," "Flume," and/or "Loggregator" may be subject to trademark rights in various jurisdictions throughout the world and are used here only in reference to the products or services properly denominated by the marks to the extent that such trademark rights may exist.)

Figure 7:
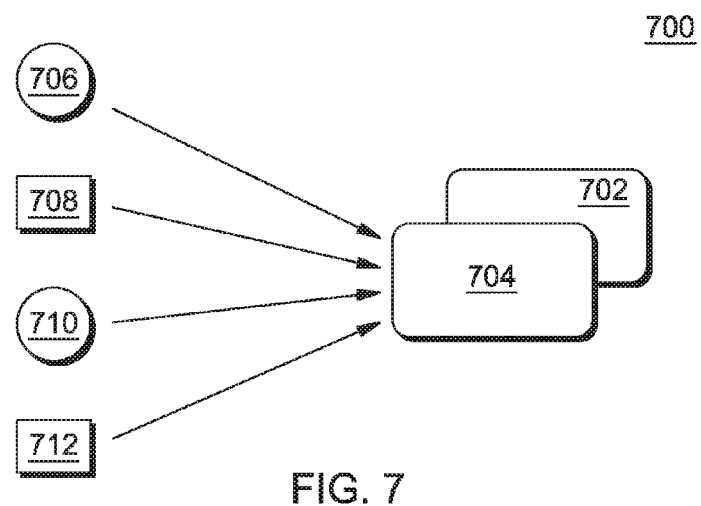
FIG. 7 is a block diagram of a third embodiment of a log analytics system according to the present invention.

Some embodiments of the present disclosure provide instructions at the collector layer for modifying collection of data sets. FIG. 7 is a block diagram of collector framework 700 according to one embodiment of the present invention. An example is shown in FIG. 7, where collector 702 takes over collector 704 in case of failures. Collectors can aggregate multiple data-sets and provide different types of syncs such as for: log file 706; database trigger 708; native binary 710; and virtual machine statistics 712.

Some embodiments of the present disclosure provide for the need to elastically scale to ever growing big data over distributed systems that traditional databases cannot handle.

Some embodiments of the present disclosure apply analytics to available data for: (i) failure prediction; and (ii) adjustment of the collector framework's data-set collection tuning.

Some embodiments of the present disclosure include an analytics backbone that provides a programming model called pipes, which forms the basis for providing analytical capabilities on the data collected across different types of data sources.

Some embodiments of the present disclosure apply the results of the analytics layer to tune the collector sync layer for data set collection.

Some embodiments of the present invention have a collector framework that has to be re-tuned each time a particular condition is identified by applying analytical routines. In such cases, the analytics engine has the algorithms to search out and find an anomaly that needs re-tuning.

IV. Further Description of the Pipes Analytics Platform

The subject matter described herein provides analytics based on a pipes programming model. The present technology introduces a concept termed herein as a "pipe." A pipe, as described herein, represents a logical construct that includes search and visualization instructions defined within a supporting programming/scripting language syntax (e.g., Python, though many others are possible). (Note: the term "Python" may be subject to trademark rights in various jurisdictions throughout the world and are used here only in reference to the products or services properly denominated by the marks to the extent that such trademark rights may exist.) A new "pipes programming model" is also described herein. The pipes programming model provides an architecture that defines and executes a "pipe" with a sequential search, modification/cleansing of searched data, and visualization of the data using a single thread request/response paradigm. As such, the pipes programming model provides compartmentalized processing of several analytical operations on data and the return of results of the analytical operations using a single hypertext transfer protocol (HTTP) request, a single HTTP thread of operation at an HTTP server, and a single HTTP response from the server by the single server HTTP thread.

A "piped HTTP request," as described herein, represents an HTTP request that includes/encapsulates scripted code that is requested to be executed against a data set by the HTTP server under the single thread of operation. The execution of the scripting language may be performed in a native scripting language runtime associated with the scripted code by the single thread of operation. A "piped HTTP response," as described herein, represents an HTTP request that includes/encapsulates the results of execution of scripted code returned by the single HTTP thread that are created in response to receipt of the piped HTTP request. The scripted code may include scripted syntax executable to perform search functions, data manipulation functions, and data visualization functions. As such, the pipes programming model described herein provides a comprehensive solution to data analytics that may improve data analysis for data sets, including large distributed data sets.

A web application is utilized herein as an example of a source platform within which a pipes programming model may be implemented and where a user may configure and initiate piped HTTP requests for analytics, as described above and in more detail below. A middleware analytics platform is utilized herein as a target platform within which the pipes programming model may be implemented and where piped HTTP requests may be executed. It is understood that other platform possibilities exist that may be utilized as a source and target platform for implementation of the pipes programming model and all such possibilities are considered within the scope of the present technology.

The search may include a distributed, batch-oriented search that is requested to be performed within the piped HTTP request using embedded scripted code within the piped HTTP request. The distributed, batch-oriented search may be performed by the HTTP server under a single thread of operation across distributed and local data nodes to query for the search results (e.g., search hits). The result of this search may be manipulated under the same thread of operation as specified by the scripted code within the HTTP request. The results of the search and/or data manipulation may be visualized through charting libraries, again under the same thread of operation and as also specified by the scripted code within the piped HTTP request. The manipulated and/or visualized search results may be returned as the response to the piped HTTP request, again under the same thread of operation. As such, a single HTTP request may be processed by an HTTP server to perform search, data manipulation, and data visualization operations on behalf of the user requesting the piped HTTP request. The results of the piped HTTP request may be rendered on a display device or other rendering output may be generated, and the rendered output may be presented to the user. Accordingly, data analytics may be improved by use of the pipes programming model described herein.

Scripting languages, such as Python, JavaScript, PHP: Hypertext Preprocessor (PHP), and Perl scripting languages, may be used as the scripting language within which the scripted code within the piped HTTP request is syntactically formulated/created. (Note: the term(s) "Python," "JavaScript," "PHP," "Hypertext Preprocessor," and/or "Perl" may be subject to trademark rights in various jurisdictions throughout the world and are used here only in reference to the products or services properly denominated by the marks to the extent that such trademark rights may exist.) Other scripting languages may also be used, as appropriate for a given implementation. As described above, and in more detail below, the scripted code is used in combination with the piped HTTP request and distributed search technologies to provide descriptive analytics for search and visualization of complex data.

As described above, a piped HTTP request results in creation of a new thread within the target platform that implements the pipes programming model. The target platform may alternatively be referred to as a middleware analytics platform. The target platform executes the pipes that are requested. The newly-created thread interprets the instructions provided in the respective sequential scripting language that defines the pipe and executes the pipe in association with the target platform. For purposes of the examples herein, there are primarily three types of instructions in a pipe, though other types may be utilized as appropriate for a given implementation. A first type of instruction in a pipe includes a search function. A second type of instruction in a pipe includes a data manipulation function. A third type of instruction in a pipe includes a data visualization function.

Regarding possible search functions, search_hits (e.g., searches for raw results based on a search criteria), search_termfacet (e.g., searches for facets or distribution of values across a specific field), search_datetimehistogram (e.g., searches for distribution of events across a histogram defined by date and time of the documents), and similar search specifications represent example search functions that may be utilized to implement a search of complex data using a single HTTP thread within the target platform. Regarding possible data manipulation functions, sort (e.g., sorting of received results based on value of fields), filter (e.g., filtering out unwanted noise in the results obtained using search functions), map (e.g., re-ordering different values in a way that may more-easily/understandably be visualized), group (e.g., aggregating received results into groups based on a characteristic of the data), and similar data manipulation specifications represent example data manipulation functions that may be utilized to implement data manipulation of search results of complex data using the single HTTP thread within the target platform. Regarding possible data visualization functions, chart_pie (e.g., visualizing as a pie chart to visualize value distribution), chart_stats (e.g., visualizing minimum, maximum and mean values), chart_chord (e.g., visualizing chord distribution of various data types to indicate relationships), chart_heatmap (e.g., visualizing heat map distribution of the values represented in the search results, such as memory utilization across servers), chart_timeline (e.g., visualizing a timeline chart showing a sequence of events in a timeline), chart_horizon (e.g., visualizing variations of values shown in a timeline), and similar data visualization specifications represent example data visualization functions that may be utilized to implement visualized output of manipulated search results of complex data using the single HTTP thread within the target platform. It should also be noted that while the example functions described above are utilized for purposes of example, other search functions, data manipulation functions, and data visualization functions are possible and all such functions are considered within the scope of the present subject matter.

It should be noted that conception of the present subject matter resulted from recognition of certain limitations associated with data analytics. For example, it was observed that data searched is often cryptic and in a format that is difficult to visualize using graphs and charts. Additionally, it was observed that the data search results often need to be manipulated, such as by being cleansed (e.g., to remove noise such as data elements that are improperly formatted), and re-formatted in different combinations, to provide effective descriptive analytics capabilities. Further, it was observed that searches often become more and more complicated which requires end-users to de-couple searching of large and distributed data stores (e.g., collectively big data) into batch oriented programs that add an additional burden on the analytics and that do not provide real-time insights with respect to the data through visualization to the end-users. The present subject matter improves data analytics by providing analytics based on a pipes programming model, as described above and in more detail below. As such, improved data analytics may be obtained through use of the technology described herein.

The analytics based on a pipes programming model described herein may be performed in real time to allow prompt visualization of complex data searches, data manipulation, and analytical data visualization. For purposes of the present description, real time shall include any time frame of sufficiently short duration as to provide reasonable response time for information processing acceptable to a user of the subject matter described. Additionally, the term "real time" shall include what is commonly termed "near real time"—generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art.

Figure 8:
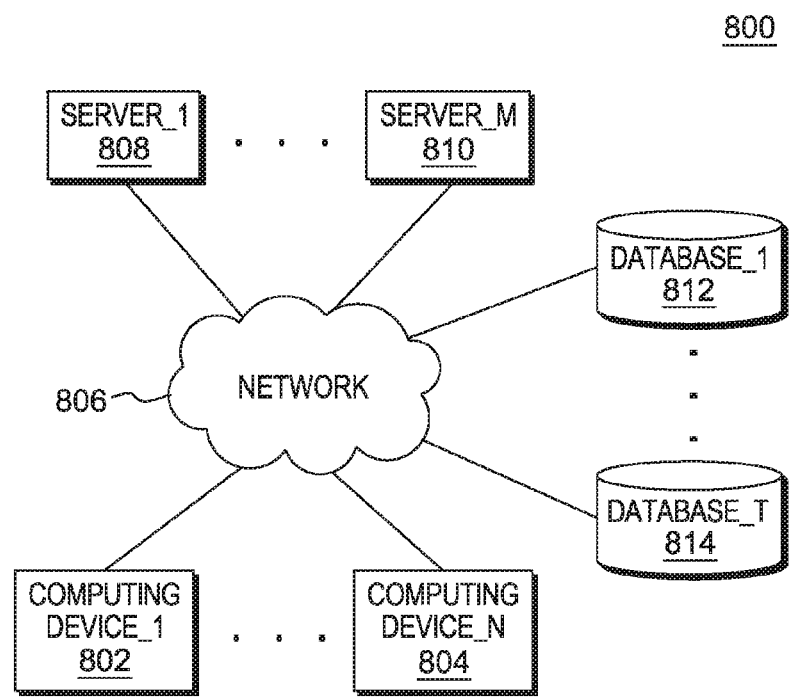
FIG. 8 is a block diagram of an example of an implementation of a system for providing analytics based on a pipes programming model.

FIG. 8 is a block diagram of an example of an implementation of a system 800 for providing analytics based on a pipes programming model. A computing device_1 802 through a computing device_N 804 communicate via a network 806 with several other devices. The other devices include a server_1 808 through a server_M 810. A database_1 812 through a database_T 814 represent physical storage locations of data, that may include complex distributed data that may be processed using the pipes programming model as described herein.

As will be described in more detail below in association with FIG. 9 through FIG. 14, the computing device_1 802 through the computing device_N 804 and the server_1 808 through the server_M 810 may each provide automated analytics based on a pipes programming model. The automated analytics based on a pipes programming model is based upon initiation of a piped HTTP request that includes scripted code by, for example, one of the computing device_1 802 through the computing device_N 804 to one of the server_1 808 through the server_M 810. Receipt of the piped HTTP request causes the respective server to create a single piped HTTP thread to process the piped HTTP request. Processing of the piped HTTP request may include processing as configured within the scripted code that is encapsulated within the piped HTTP request, and the processed results are returned by the single piped HTTP thread to the requesting computing device. A variety of possibilities exist for implementation of the present subject matter, and all such possibilities are considered within the scope of the present subject matter.

It should be noted that any of the respective computing devices described in association with FIG. 8 may be portable computing devices, either by a user's ability to move the respective computing devices to different locations, or by the respective computing device's association with a portable platform, such as a plane, train, automobile, or other moving vehicle. It should also be noted that the respective computing devices may be any computing devices capable of processing information as described above and in more detail below. For example, the respective computing devices may include devices such as a personal computer (e.g., desktop, laptop, etc.) or a handheld device (e.g., cellular telephone, personal digital assistant (PDA), email device, music recording or playback device, tablet computing device, e-book reading device, etc.), a web server, application server, or other data server device, or any other device capable of processing information as described above and in more detail below.

The network 806 may include any form of interconnection suitable for the intended purpose, including a private or public network such as an intranet or the Internet, respectively, direct inter-module interconnection, dial-up, wireless, or any other interconnection mechanism capable of interconnecting the respective devices.

The server_1 808 through the server_M 810 may include any device capable of providing data for consumption by a device, such as the computing device_1 802 through the computing device_N 804, via a network, such as the network 806. As such, the server_1 808 through the server_M 810 may each include a web server, application server, or other data server device.

Figure 9:
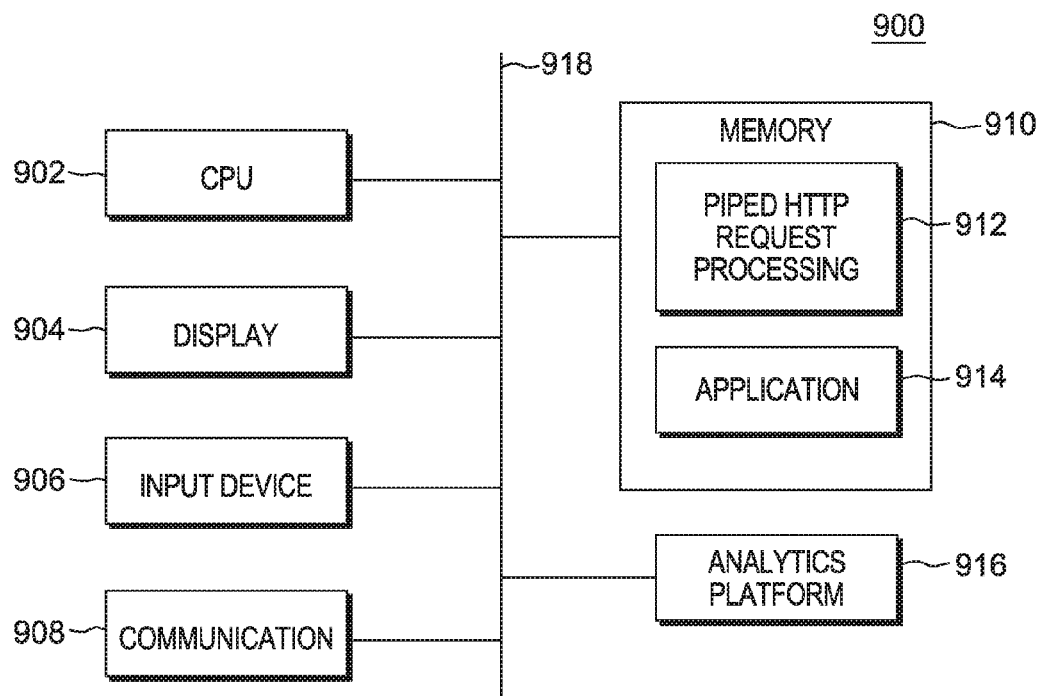
FIG. 9 is a block diagram of an example of an implementation of a core processing module for performing analytics based on a pipes programming model.

FIG. 9 is a block diagram of an example of an implementation of a core processing module 900 capable of performing analytics based on a pipes programming model. The core processing module 900 may be associated with either the computing device_1 802 through the computing device_N 804 or with the server_1 808 through the server_M 810, as appropriate for a given implementation. As such, the core processing module 900 is described generally herein, though it is understood that many variations on implementation of the components within the core processing module 900 are possible and all such variations are within the scope of the present subject matter.

Further, the core processing module 900 may provide different and complementary processing of piped HTTP requests in association with each implementation. As such, for any of the examples below, it is understood that any aspect of functionality described with respect to any one device that is described in conjunction with another device (e.g., sends/sending, etc.) is to be understood to concurrently describe the functionality of the other respective device (e.g., receives/receiving, etc.).

A central processing unit (CPU) 902 provides computer instruction execution, computation, and other capabilities within the core processing module 900. A display 904 provides visual information to a user of the core processing module 900 and an input device 906 provides input capabilities for the user.

The display 904 may include any display device, such as a cathode ray tube (CRT), liquid crystal display (LCD), light emitting diode (LED), electronic ink displays, projection, touchscreen, or other display element or panel. The input device 906 may include a computer keyboard, a keypad, a mouse, a pen, a joystick, touchscreen, or any other type of input device by which the user may interact with and respond to information on the display 904.

It should be noted that the display 904 and the input device 906 may be optional components for the core processing module 900 for certain implementations/devices, such as in association with the server_1 808 through the server_M 810. Accordingly, the core processing module 900 may operate as a completely automated embedded device without direct user configurability or feedback. However, the core processing module 900 may also provide user feedback and configurability via the display 904 and the input device 906, respectively, as appropriate for a given implementation.

A communication module 908 provides interconnection capabilities that allow the core processing module 900 to communicate with other modules within the system 900. The communication module 908 may include any electrical, protocol, and protocol conversion capabilities useable to provide interconnection capabilities, appropriate for a given implementation.

A memory 910 includes a piped HTTP request processing storage area 912 that provides storage for processing of piped HTTP requests in association with the core processing module 900. For example, where the core processing module 900 is associated with the computing device_1 802 through the computing device_N 804, the piped HTTP request processing storage area 912 may be used for the creation of piped HTTP requests. Similarly, where the core processing module 900 is associated with the server_1 808 through the server_M 810, the piped HTTP request processing storage area 912 may be used to store and process received piped HTTP requests.

An application area 914 provides storage and execution space for one or more applications executed, for example, by the CPU 902. The application area 914 may execute an application, for example in association with the computing device_1 802 through the computing device_N 804, to create and send piped HTTP requests to one or more of the server_1 808 through the server_M 810. Such an application may also receive piped HTTP responses and render the received and processed data using the display 904 or other output device.

It is understood that the memory 910 may include any combination of volatile and non-volatile memory suitable for the intended purpose, distributed or localized as appropriate, and may include other memory segments not illustrated within the present example for ease of illustration purposes. For example, the memory 910 may include a code storage area, an operating system storage area, a code execution area, and a data area without departure from the scope of the present subject matter.

An analytics platform module 916 is also illustrated. The analytics platform module 916 provides processing capabilities for processing of piped HTTP requests for the core processing module 900, as described above and in more detail below. The analytics platform module 916 implements the analytics based on a pipes programming model of the core processing module 900. The examples described herein utilize the analytics platform module 916 in association with the server_1 808 through the server_M 810 to process piped HTTP requests created and received from the computing device_1 802 through the computing device_N 804. However, it is understood that the analytics platform module 916 may be implemented in association with one or more of the computing device_1 802 through the computing device_N 804, as appropriate for the given implementation.

It should also be noted that the analytics platform module 916 may form a portion of other circuitry described without departure from the scope of the present subject matter. Further, the analytics platform module 916 may alternatively be implemented as an application stored within the memory 910. In such an implementation, the analytics platform module 916 may include instructions executed by the CPU 902 for performing the functionality described herein. The CPU 902 may execute these instructions to provide the processing capabilities described above and in more detail below for the core processing module 900. The analytics platform module 916 may form a portion of an interrupt service routine (ISR), a portion of an operating system, a portion of a browser application, or a portion of a separate application without departure from the scope of the present subject matter.

The CPU 902, the display 904, the input device 906, the communication module 908, the memory 910, and the analytics platform module 916 are interconnected via an interconnection 918. The interconnection 918 may include a system bus, a network, or any other interconnection capable of providing the respective components with suitable interconnection for the respective purpose.

Though the different modules illustrated within FIG. 9 are illustrated as component-level modules for ease of illustration and description purposes, it should be noted that these modules may include any hardware, programmed processor(s), and memory used to carry out the functions of the respective modules as described above and in more detail below. For example, the modules may include additional controller circuitry in the form of application specific integrated circuits (ASICs), processors, antennas, and/or discrete integrated circuits and components for performing communication and electrical control activities associated with the respective modules. Additionally, the modules may include interrupt-level, stack-level, and application-level modules as appropriate. Furthermore, the modules may include any memory components used for storage, execution, and data processing for performing processing activities associated with the respective modules. The modules may also form a portion of other circuitry described or may be combined without departure from the scope of the present subject matter.

Additionally, while the core processing module 900 is illustrated with and has certain components described, other modules and components may be associated with the core processing module 900 without departure from the scope of the present subject matter. Additionally, it should be noted that, while the core processing module 900 is described as a single device for ease of illustration purposes, the components within the core processing module 900 may be co-located or distributed and interconnected via a network without departure from the scope of the present subject matter. For a distributed arrangement, the display 904 and the input device 906 may be located at a point of sale device, kiosk, or other location, while the CPU 902 and memory 910 may be located at a local or remote server. Many other possible arrangements for components of the core processing module 900 are possible and all are considered within the scope of the present subject matter. It should also be understood that, though the database 912 through the database 914 are illustrated as separate components for purposes of example within FIG. 9, the information stored within one or more of the respective databases may also/alternatively be stored within the memory 910 without departure from the scope of the present subject matter. Accordingly, the core processing module 900 may take many forms and may be associated with many platforms.

Figure 10:
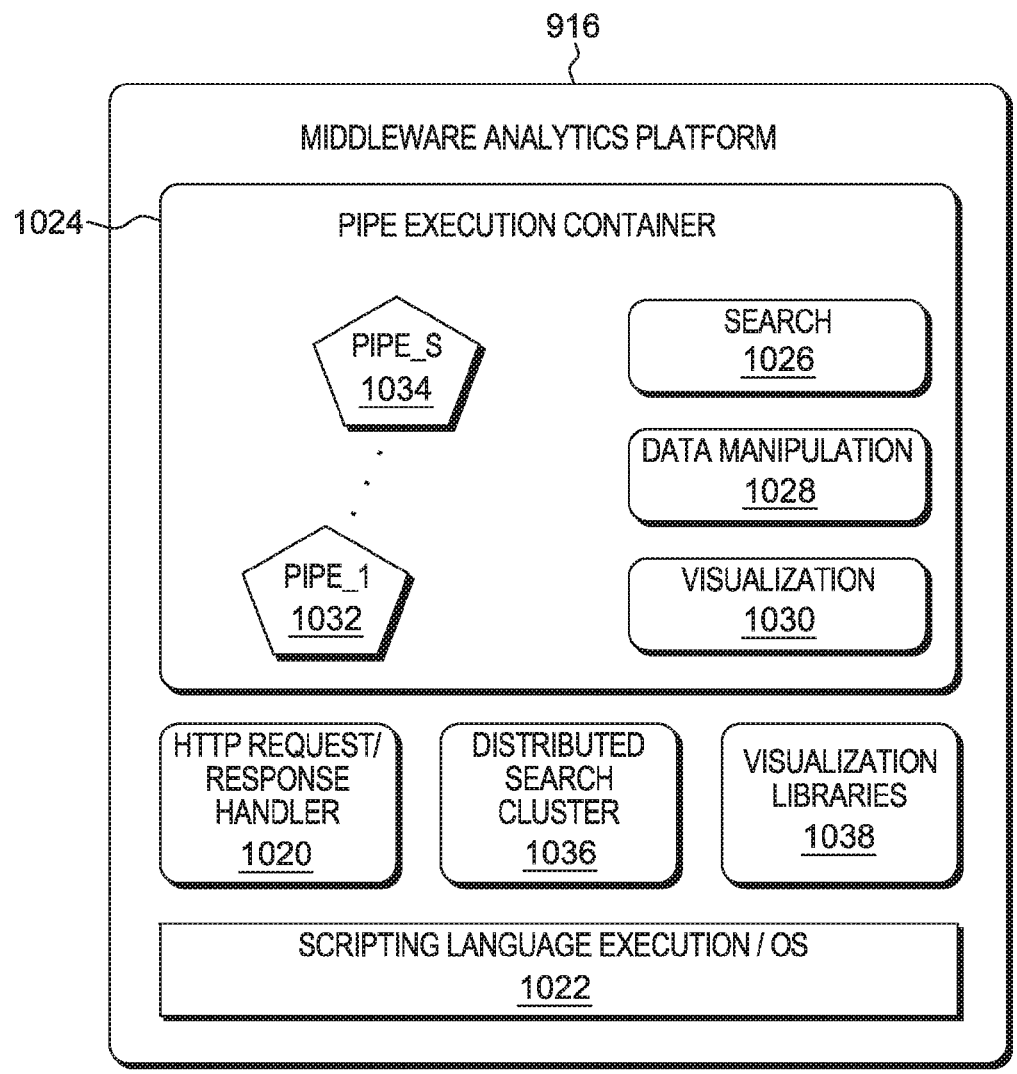
FIG. 10 is a block diagram of an example of an implementation of additional details associated performing analytics based on a pipes programming model.

FIG. 10 is a block diagram of an example of an implementation of additional details associated with the analytics platform module 916 of FIG. 9 for performing analytics based on a pipes programming model. As described above, piped HTTP requests include scripted code that is requested to be executed against a data set by an HTTP server under a single thread of operation. The analytics platform module 916 may be implemented in a variety of technologies, such as a middleware analytics platform.

The analytics platform module 916 includes an HTTP request/response handler 1020. In response to receiving a piped HTTP request, the HTTP request/response handler 1020 processes the initial piped HTTP request by creating a thread to process the request. The created thread understands the programmatic semantics of the scripted code defined in the pipe to perform data searches, data manipulation, and data visualization, as specified by the scripted code in the piped HTTP request. The instructions represented by the scripted code in the piped HTTP request are executed by the single coordinated thread initiated by the HTTP request/response handler 1020 using a scripting language execution/operating system (OS) module 1022.

As such, the HTTP request/response handler 1020 detects that a piped HTTP request has been received, interprets the request, determines that the request includes scripted code (e.g., is a piped HTTP request), and creates a piping function with the created thread to implement single-threaded execution of the various scripted code segments within the piped HTTP request and to respond as a single threaded piped HTTP response to the initial piped HTTP request.

The analytics platform module 916 additionally includes a pipe execution container 1024 that includes a pipe execution engine composed of a search engine 1026, a data manipulation engine 1028, and a visualization engine 1030. The pipe execution container 1024 specifies how multiple concurrently-executing pipes, represented by the pipe_1 832 through the pipe_S 834, are to be defined for execution by the search engine 1026, the data manipulation engine 1028, and the visualization engine 1030. The pipe execution container 1024 defines how syntax is to be constructed for execution of the piped HTTP requests, and also executes the received piped HTTP requests using modules in the pipe execution container 1024 itself, as described in more detail below. As such, the pipe execution container 1024 specifies interface definition and execution capabilities for piped HTTP requests, determines that configured interface processing syntactic specifications are satisfied by received piped HTTP requests, and executes compliant piped HTTP requests as described above and in more detail below. As represented within FIG. 10, multiple single-threaded piped HTTP requests may be processed concurrently by the creation of multiple pipes 1032 through 1034 within the pipe execution container 1024.

Regarding data searches specified within the scripted code in the piped HTTP request, the created thread is configured to understand how to perform a data search using the search engine 1026. The created thread converts the data search scripted code for the designated search function into search semantics, as appropriate for a given implementation, that may be understood by a search engine, such as the search engine 1026, and initiates the data search as specified by the scripted code within the piped HTTP request. A search request may be sent, for example, to a distributed search cluster 1036. This data search processing may be implemented as a blocking call on the created thread. As such, the results of the data search may be returned to the created thread for additional processing, as specified by the scripted code within the piped HTTP request and as described in more detail below.

Once the data search results have been received, the next set of instructions within the scripted code in the piped HTTP request represents the requested data manipulation functions. Native scripting language power may be leveraged and used for manipulation of raw data returned by the data search execution, again as part of the single-threaded piped HTTP request/response sequence using the data manipulation engine 1028. As described above, the data manipulation processing may include, for example, filtering or other data manipulation, as appropriate for a given implementation.

Once the data manipulation processing has been completed, the third step to complete the processing of the piped HTTP request is to utilize the visualization engine 1030 to feed the cleansed/manipulated data from the previous data manipulation processing into one or more visualization libraries 1038 to process the data with visualization library functions to create graphs/charts for visualization.

As such, the analytics platform module 916 provides single-threaded execution of piped HTTP requests for search, data manipulation using native scripting language, and data visualization using visualization libraries. The HTTP requests result in a single-threaded management task encompassing a distributed search, manipulation of data, and data visualization. The analytics platform module 916 provides a framework through which a pipe that includes scripted code for search, data manipulation, and visualization are executed within a pipes programming model.

Figure 11:
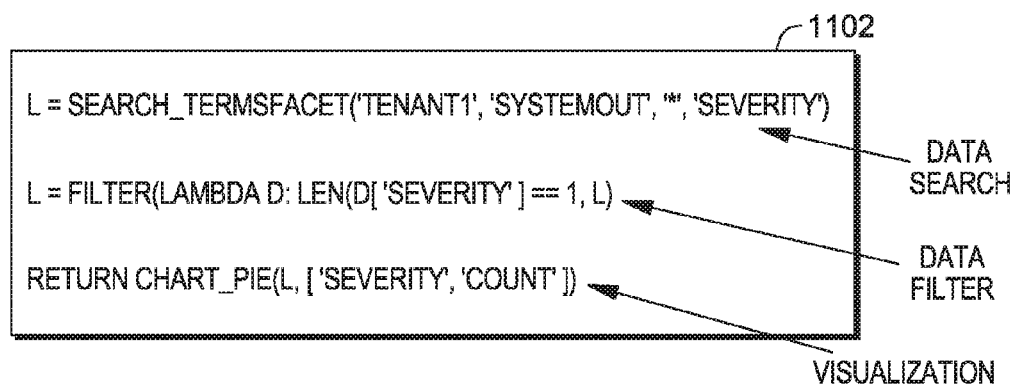
FIG. 11 is a diagram of an example of an implementation of a piped HTTP request scripted code input and piped HTTP response visualized data output for performing analytics based on a pipes programming model according to an embodiment of the present subject matter.
Figure 11:
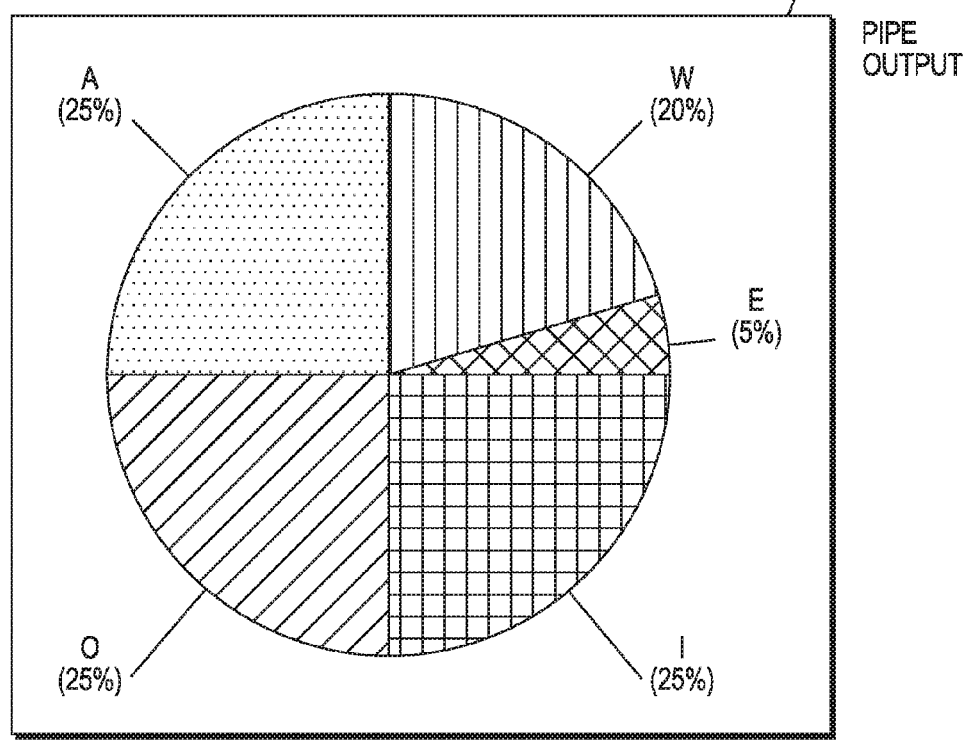

FIG. 11 is a diagram 1100 of an example of an implementation of a piped HTTP request scripted code input 1102 and piped HTTP response visualized data output 1104 for performing analytics based on a pipes programming model. As can be seen from FIG. 11, piped HTTP request scripted code input 1102 includes three lines of scripted code that respectively represent a data search, data manipulation in the form of data filtering, and data visualization that specifies a pie chart output using visualization libraries. The pseudo syntax represented within FIG. 11 may be considered to represent a pseudo implementation of scripted code that is based on the Python scripting language implementation, though as described above any scripting language may be utilized to implement the present technology as appropriate for a given implementation. (Note: the term "Python" may be subject to trademark rights in various jurisdictions throughout the world and are used here only in reference to the products or services properly denominated by the marks to the extent that such trademark rights may exist.)

The lines of scripted code represented by the piped HTTP request scripted code input 1102 of FIG. 11 may be entered by a user of the present technology in the form of an HTTP POST instruction formed similarly to the pseudo syntax HTTP POST instruction shown below.

```
HTTP POST server.com/service/pipe
  body start
    L=SEARCH_TERMSFACET('TENANT1', 'SYSTEMOUT', '*', 'SEVERITY')
    L=FILTER(LAMBDA D: LEN(D['SEVERITY'])==1, L)
    return CHART_PIE(L, ['SEVERITY', 'COUNT'])
  body end
```

As can be seen within the pseudo syntax of the HTTP POST instruction above, the first instruction in the "pipe" uses the native execution of Python scripting language code to specify a data search. A search has been requested within a multi-tenant database for a tenant identified as "TENANT1." The variable "SYSTEMOUT" represents logs generated by an application server that are to be searched. It should be noted that many types of data may be stored, such as finance data and other forms of data, and that different types of logs may be generated and audited/searched. The wildcard symbol "*" indicates that the search is specified against all available data in the logs specified by the SYSTEMOUT variable. The "SEVERITY" indicator specifies that a distribution of severity across all of the data has been requested, such as how many times did a "severity field" within the searched logs have any indication of errors, warnings, or other information captured. The variable "L" is used to store the returned search results for further processing by the data manipulation processing of the pipe.

The second instruction in the pipe uses the native execution of Python scripting language code to filter as the data manipulation which is specified within the pseudo syntax of the HTTP POST instruction to be a "FILTER" function. The filtering is specified to filter out noise in the data (e.g., data elements that are improperly formatted) by removing all the search hits where the results contain more than one (1) character (where properly formatted data is considered to be data of one character). For purposes of the present example, it is assumed that the "severity field" within the searched logs is configured to have one character if valid data is present. As such, more than one character indicates noise within the search results and such search results are removed prior to visualization. The results of the filtering are again assigned to the variable "L" to store the returned search results for further processing and visualization of the pipe.

The third instruction in the pipe takes the result from the previous data manipulation step and outputs a pie chart with the data filtered as returned by the search. The "CHART_PIE" instruction operates to invoke a charting library and selection of a pie chart as the specified visualized output of the pipe that is returned by the piped HTTP response. The piped HTTP response visualized data output 1104 represents an example output of visualized and manipulated search results.

It should be noted that the numbers selected for the portions of the pie chart are selected for ease of illustration only and the drawing is not considered to be to scale. For purposes of example, it should be noted that a "severity" field/variable may have several values. As such, a representative search may determine from the severity variable that Application, as represented by the variable "A," constitutes twenty-five percent (25%) of the search results. Also from the severity variable, Output, as represented by the variable "O," constitutes twenty-five percent (25%) of the search results. Warnings, as represented by the variable "W," constitutes twenty percent (20%) of the search results. Errors, as represented by the variable "E," constitutes five percent (5%) of the search results. Lastly, information entries, as represented by the variable "I," constitutes twenty-five percent (25%) of the search results. Again, the numbers utilized in this example are for ease of illustration only and the drawing is not considered to be to scale.

The piped HTTP response visualized data output 1104 may be rendered on a display of a computing device utilized by the user to issue the piped HTTP request. As such, the present technology provides advanced data search, data manipulation, and data visualization capabilities. A single piped HTTP invocation results in the execution of a scripting language-based distributed search, a scripting language-based manipulation of searched data, and a scripting language-based visualization of the manipulated search results.

Figure 12:
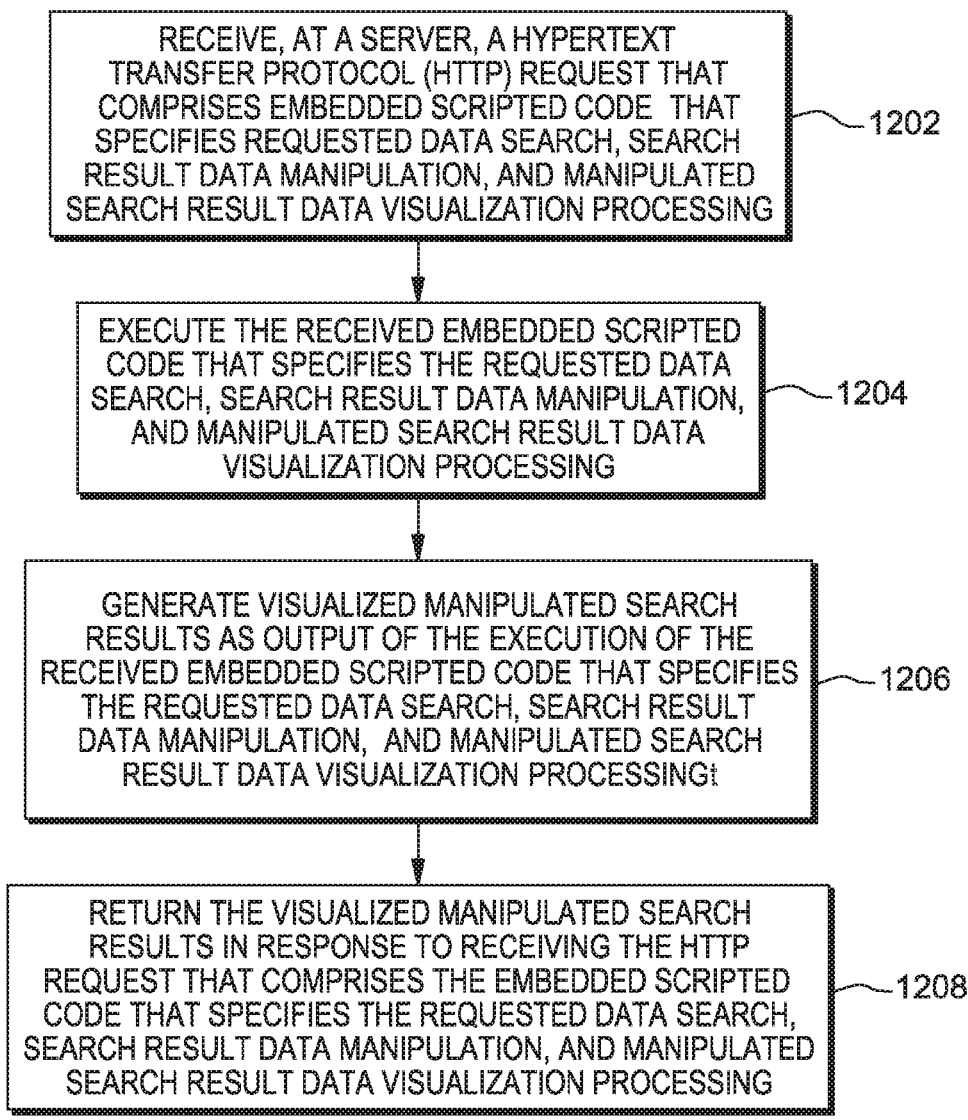
FIG. 12 is a flow chart of a third method according to the present invention.
Figure 13:
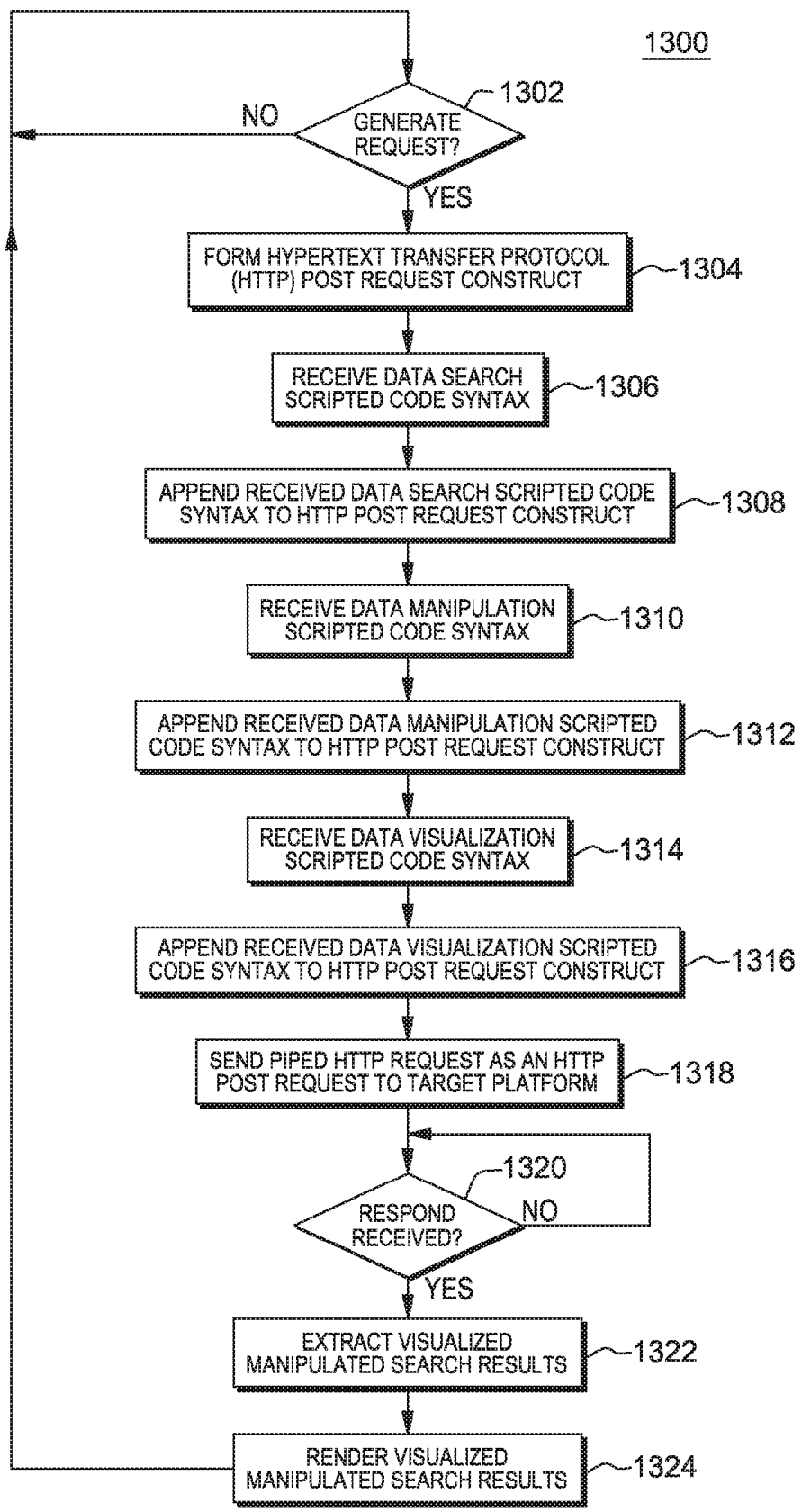
FIG. 13 is a flow chart of a fourth method according to the present invention.
Figure 14:
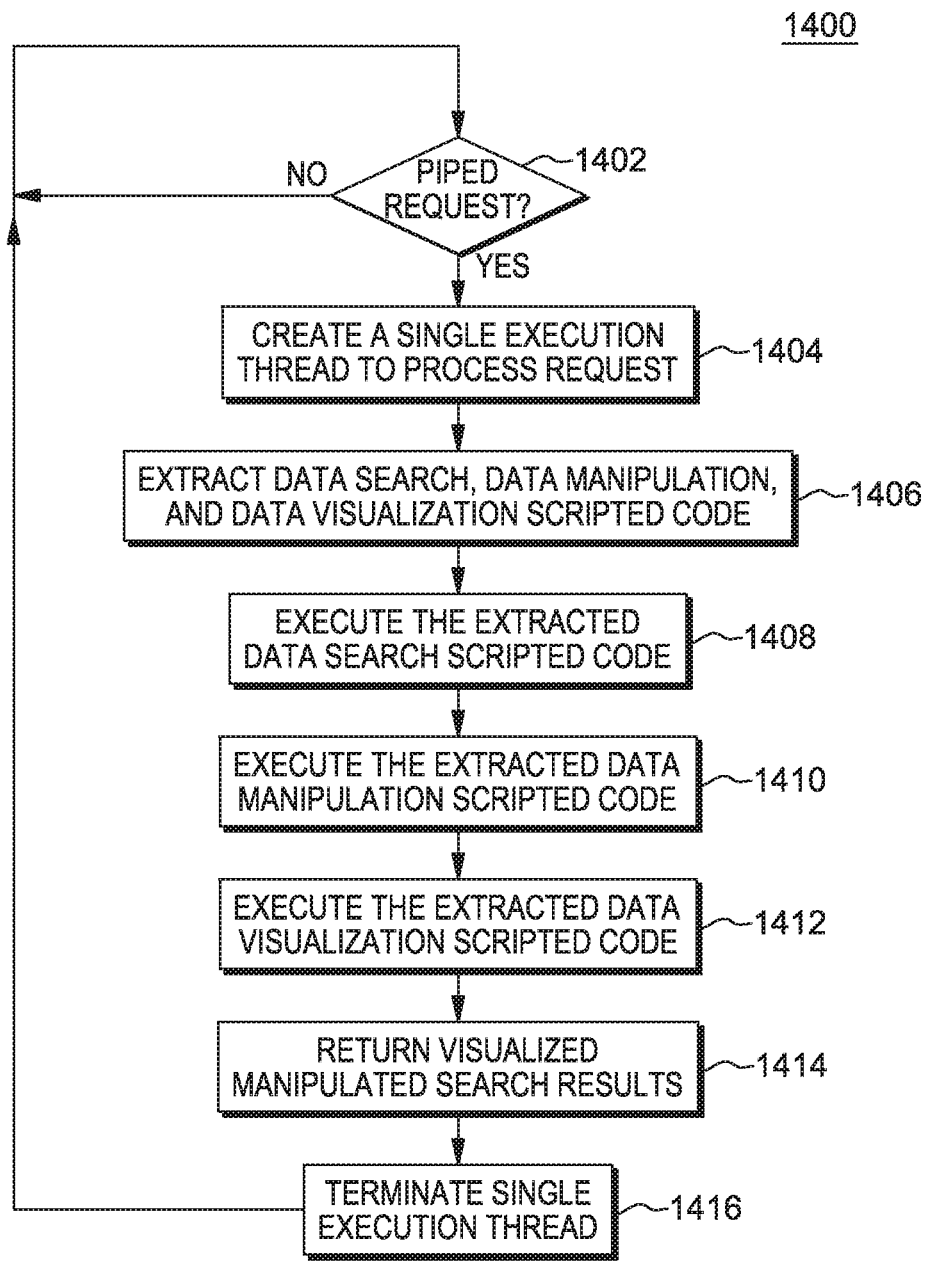
FIG. 14 is a flow chart of a fifth method according to the present invention.

FIG. 12 through FIG. 14 described below represent example processes that may be executed by devices, such as the core processing module 900, to perform the analytics based on a pipes programming model associated with the present subject matter. Many other variations on the example processes are possible and all are considered within the scope of the present subject matter. The example processes may be performed by modules, such as the analytics platform module 916 and/or executed by the CPU 902, associated with such devices. It should be noted that time out procedures and other error control procedures are not illustrated within the example processes described below for ease of illustration purposes. However, it is understood that all such procedures are considered to be within the scope of the present subject matter. Further, the described processes may be combined, sequences of the processing described may be changed, and additional processing may be added or removed without departure from the scope of the present subject matter.

FIG. 12 is a flow chart of an example of an implementation of a process 1200 for performing analytics based on a pipes programming model. At block 1202, the process 1200 receives, at a server, a hypertext transfer protocol (HTTP) request that comprises embedded scripted code that specifies requested data search, search result data manipulation, and manipulated search result data visualization processing. At block 1204, the process 1200 executes the received embedded scripted code that specifies the requested data search, search result data manipulation, and manipulated search result data visualization processing. At block 1206, the process 1200 generates visualized manipulated search results as output of the execution of the received embedded scripted code that specifies the requested data search, search result data manipulation, and manipulated search result data visualization processing. At block 1208, the process 1200 returns the visualized manipulated search results in response to receiving the HTTP request that comprises the embedded scripted code that specifies the requested data search, search result data manipulation, and manipulated search result data visualization processing.

FIG. 13 is a flow chart of an example of an implementation of a process 1300 for initiating piped hypertext transfer protocol (HTTP) requests to request analytics based on a pipes programming model. At decision point 1302, the process 1300 makes a determination as to whether a request to generate a piped HTTP request has been detected, such as from a user of a computing device such as one of the computing device_1 802 through the computing device_N 804. The examples of FIG. 13 utilize the example pseudo syntax described above in association with FIG. 11.

Returning to the description of decision point 1302, in response to determining that a request to generate a piped HTTP request has been detected, the process 1300 forms an HTTP POST request construct at block 1304, such as described above in association with FIG. 10, where the HTTP POST server.com/service/pipe is followed, in a new line, by "body start." At block 1306, the process 1300 receives data search scripted code syntax from the user, such as the syntax "L=SEARCH_TERMSFACET('TENANT1', 'SYSTEMOUT', '*', 'SEVERITY')" described above. The process 1300 may detect a "return" key/new line entry or "enter" key depressed by the user to determine that the scripted text entry for the data search scripted code syntax of the piped HTTP request has been completed. At block 1308, the process 1300 appends the received data search scripted code syntax to the HTTP POST request construct.

At block 1310, the process 1300 receives data manipulation scripted code syntax from the user, such as the syntax "L=FILTER(LAMBDA D: LEN(D['SEVERITY']==1, L)" described above. The process 1300 may detect a "return" key/new line entry or "enter" key depressed by the user to determine that the scripted text entry for the data manipulation scripted code syntax of the piped HTTP request has been completed. At block 1312, the process 1300 appends the received data manipulation scripted code syntax to the HTTP POST request construct.

At block 1314, the process 1300 receives data visualization scripted code syntax from the user, such as the syntax "CHART_PIE(L, ['SEVERITY', 'COUNT'])" described above. The process 1300 may detect entry of the word "return" by the user as an indication that the HTTP POST request is completed by this entry, and may detect entry of a "return" key/new line entry or "enter" key depressed by the user to determine that the scripted text entry for the data visualization scripted code syntax of the piped HTTP request has been completed. At block 1316, the process 1300 appends the received data virtualization scripted code syntax to the HTTP POST request construct and appends the "body end" to the HTTP POST request to form the piped HTTP request.

At block 1318, the process 1300 sends the piped HTTP request as an HTTP POST request to the target platform, as described above. At decision point 1320, the process 1300 makes a determination as to whether a piped HTTP response has been received from the target platform. In response to determining that the piped HTTP response has been received from the target platform, the process 1300 extracts the visualized manipulated search results from the piped HTTP response at block 1322. At block 1324, the process 1300 renders the visualized manipulated search results. The process 1300 returns to decision point 1302 and iterates as described above.

As such, the process 1300 receives scripted code syntax from a user that specifies a data search of complex and/or distributed data, receives scripted code syntax from a user that specifies manipulation of the search results (e.g., filtering), and receives scripted code syntax from a user that specifies visualization output formatting for the manipulated search results. Within the present example, an HTTP POST request is used to encapsulate the respective scripted code segments to form the piped HTTP request, though it is understood that other implementations are possible and all such implementations are considered within the scope of the present subject matter. The piped HTTP response includes a rendering of the results of the piped HTTP request and the results are displayed to the user. As such, the user of a computing device may specify scripted code segments to be executed by a remote server to perform complex data search, manipulation, and visualization processing. Accordingly, complex data searches, data manipulations, along with data visualization of the manipulated search results, may be delegated to a server under user control by specification of scripted code syntax to be executed by the server to perform the requested operations.

FIG. 14 is a flow chart of an example of an implementation of a process 1400 for processing piped hypertext transfer protocol (HTTP) requests and performing analytics based on a pipes programming model. The process 1400 may execute, for example, at a server device such as the server_1 808 through the server_M 810. The examples of FIG. 14 may also be implemented using the example pseudo syntax described above in association with FIG. 10, though the specific syntax of those examples is not repeated for brevity. As described above, an HTTP POST construct is used for purpose of example to represent a piped HTTP request, though it is understood that other implementations are possible and all such implementations are considered within the scope of the present subject matter.

At decision point 1402, the process 1400 makes a determination as to whether a piped HTTP request that includes embedded scripted code segments has been detected, such as from one of the computing device_1 802 through the computing device_N 804. As described above, the embedded scripted code may specify requested data search, search result data manipulation, and manipulated search result data visualization processing. In response to determining that a piped HTTP request that includes the embedded scripted code segments has been detected, the process 1400 creates a single execution thread to process the received piped HTTP request at block 1404. As described above, this single created execution thread operates to implement the pipes programming model by executing the piped HTTP request and responding with a piped HTTP response. Further, as also described above, the execution of the scripted code segments formed in the respective scripting language may be performed in a native scripting language runtime associated with the scripted code segments by the single created execution thread. For example, the execution of the scripted code segments may be performed within a native Phython scripting language runtime, a native JavaScript scripting language runtime, a PHP: Hypertext Preprocessor (PHP) scripting language runtime, a native Perl scripting language runtime, or other native scripting language runtime based upon the syntactic encoding of the scripted code segments. (Note: the term(s) "Python," "JavaScript," "PHP," "Hypertext Preprocessor," and/or "Perl" may be subject to trademark rights in various jurisdictions throughout the world and are used here only in reference to the products or services properly denominated by the marks to the extent that such trademark rights may exist.)

At block 1406, the process 1400 extracts the data search scripted code syntax, the data manipulation scripted code syntax, and the data visualization scripted code syntax from the received piped HTTP request. At block 1408, the process 1400 executes the extracted data search scripted code within the native scripting language runtime associated with the search scripted code. For example, the extracted data search scripted code may specify a requested distributed database search, such as of the distributed search cluster 836 described above of, for example, a per-tenant search within a multi-tenant system. At block 1410, the process 1400 executes the extracted data manipulation scripted code within the native scripting language runtime associated with the data manipulation scripted code. For example, the extracted data manipulation scripted code may specify a requested search result filtering or other processing of the search results. At block 1412, the process 1400 executes the extracted data visualization scripted code within the native scripting language runtime associated with the data visualization scripted code to generate the visualized manipulated search results as the output of the execution of the received embedded scripted code that specifies the requested data search, search result data manipulation, and manipulated search result data visualization processing. For example, the extracted data visualization scripted code may specify a requested graphical output formatting of the manipulated search result data or other output format, such as a pie chart, histogram, or other formatted output of the manipulated search results. The process 1400 may identify a charting library that includes visualization output functions usable to generate the requested visualized manipulated search results. The process 1400 may also select a charting library function to generate the requested visualized manipulated search results, and may generate the visualized manipulated search results using syntax that invokes the selected charting library function.

At block 1414, the process 1400 returns the visualized manipulated search results in response to receiving the piped HTTP request that includes the embedded scripted code that specifies the requested data search, search result data manipulation, and manipulated search result data visualization processing. The return of the visualized manipulated search results may be performed as a piped HTTP response by the single created thread that executed the received embedded scripted code to unify the processing and responsiveness of the piped HTTP request. At block 1416, the process 1400 terminates the single execution thread, and returns to decision point 1402 and iterates as described above.

As such, the process 1400 operates to receive and process piped HTTP requests. Embedded scripted code that specifies requested data search, search result data manipulation, and manipulated search result data visualization processing is executed by a single execution thread that is created to process the piped HTTP request. A piped HTTP response that includes visualized output of the manipulated search results is returned by the single execution thread. As such, the process 1400 performs complex data searches, data manipulations, and data visualizations of the manipulated search results, that have been delegated to a server under user control by specification of scripted code syntax to be executed by the server to perform the requested operations.

As described above in association with FIG. 8 through FIG. 14, the example systems and processes provide analytics based on a pipes programming model. Many other variations and additional activities associated with analytics based on a pipes programming model are possible and all are considered within the scope of the present subject matter.

V. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

User/subscriber: includes, but is not necessarily limited to, the following: (i) a single individual human; (ii) an artificial intelligence entity with sufficient intelligence to act as a user or subscriber; and/or (iii) a group of related users or subscribers.

Electrically Connected: means either directly electrically connected, or indirectly electrically connected, such that intervening elements are present; in an indirect electrical connection, the intervening elements may include inductors and/or transformers.

Mechanically connected: Includes both direct mechanical connections, and indirect mechanical connections made through intermediate components; includes rigid mechanical connections as well as mechanical connection that allows for relative motion between the mechanically connected components; includes, but is not limited, to welded connections, solder connections, connections by fasteners (for example, nails, bolts, screws, nuts, hook-and-loop fasteners, knots, rivets, quick-release connections, latches and/or magnetic connections), force fit connections, friction fit connections, connections secured by engagement caused by gravitational forces, pivoting or rotatable connections, and/or slidable mechanical connections.

Data communication: any sort of data communication scheme now known or to be developed in the future, including wireless communication, wired communication and communication routes that have wireless and wired portions; data communication is not necessarily limited to: (i) direct data communication; (ii) indirect data communication; and/or (iii) data communication where the format, packetization status, medium, encryption status and/or protocol remains constant over the entire course of the data communication.

Receive/provide/send/input/output: unless otherwise explicitly specified, these words should not be taken to imply: (i) any particular degree of directness with respect to the relationship between their objects and subjects; and/or (ii) absence of intermediate components, actions and/or things interposed between their objects and subjects.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Software storage device: any device (or set of devices) capable of storing computer code in a manner less transient than a signal in transit.

Tangible medium software storage device: any software storage device (see Definition, above) that stores the computer code in and/or on a tangible medium.

Computer: any device with significant data processing and/or machine readable instruction reading capabilities including, but not limited to: desktop computers, mainframe computers, laptop computers, field-programmable gate array (fpga) based devices, smart phones, personal digital assistants (PDAs), body-mounted or inserted computers, embedded device style computers, application-specific integrated circuit (ASIC) based devices.

What is claimed is:

1. A method comprising:
responsive to an occurrence of an alert condition, generating a piped HTTP request for performing analytics on a first set of machine data in a search cluster, the first set of machine data collected by a collector according to a first configuration of the collector, the first configuration establishing default data collection levels;
receiving a single-threaded, piped HTTP response to the piped HTTP request as analytics output;
determining a second configuration for the collector to collect a second set of machine data responsive to the analytics output, the second configuration establishing debug data collection levels, wherein the debug data collection level causes a list of events to be monitored for data collection in addition to actions of the default data collection levels;
executing a sync instruction to the collector to replace the first configuration with the second configuration; and
causing the collector to collect a second set of machine data by processing new machine data according to the second configuration, the new machine data generated after the occurrence of the alert condition;
wherein:
the second set of machine data includes event-specific data determined to be relevant by the performing analytics on the first set of machine data.

2. The method of claim 1, further comprising:
causing a sensor to record first machine data from a first enterprise component, the first machine data being processed by the collector to collect the first set of machine data.

3. The method of claim 2 further comprising:
responsive to the analytics output, adjusting a scope of data capture corresponding to recording machine data by causing the sensor to record the new machine data from the first enterprise component and a second enterprise component.

4. The method of claim 2, further comprising:
causing the collector to collect the first set of machine data by processing a portion of the recorded machine data according to the first configuration, the first collector programmed to distribute the first set of machine data to the search cluster.

5. The method of claim 1, wherein:
the analytics output is produced by performing analytics on the first set of machine data in real time; and
receiving the single-threaded, piped HTTP response occurs in real time.

6. The method of claim 1, further comprising:
determining the occurrence of the alert condition; and
wherein:
the alert condition occurs when a threshold stored memory size of the search cluster is reached.

7. The method of claim 1, further comprising:
responsive to a completion of a pre-determined time period during which the collector operates according to the second configuration, returning the collector to the first configuration.

8. A computer program product comprising a computer-readable storage medium having a set of instructions stored therein which, when executed by a processor, causes the processor to perform a tuning action by:
responsive to an occurrence of an alert condition, generating a piped HTTP request for performing analytics on a first set of machine data in a search cluster, the first set of machine data collected by a collector according to a first configuration of the collector, the first configuration establishing default data collection levels;
receiving a single-threaded, piped HTTP response to the piped HTTP request as analytics output;
determining a second configuration for the collector to collect a second set of machine data responsive to the analytics output, the second configuration establishing debug data collection levels, wherein the debug data collection level causes a list of events to be monitored for data collection in addition to actions of the default data collection levels;

executing a sync instruction to the collector to replace the first configuration with the second configuration; and causing the collector to collect a second set of machine data by processing new machine data according to the second configuration, the new machine data generated after the occurrence of the alert condition;

wherein:

the second set of machine data includes event-specific data determined to be relevant by the performing analytics on the first set of machine data.

9. The computer program product of claim 8, further causing the processor to perform a tuning action by:

causing a sensor to record first machine data from a first enterprise component, the first machine data being processed by the collector to collect the first set of machine data.

10. The computer program product of claim 9, further causing the processor to perform a tuning action by:

responsive to the analytics output, adjusting a scope of data capture corresponding to recording machine data by causing the sensor to record the new machine data from the first enterprise component and a second enterprise component.

11. The computer program product of claim 9, further causing the processor to perform a tuning action by:

causing the collector to collect the first set of machine data by processing a portion of the recorded machine data according to the first configuration, the first collector programmed to distribute the first set of machine data to the search cluster.

12. The computer program product of claim 8, wherein:

the analytics output is produced by performing analytics on the first set of machine data in real time; and receiving the single-threaded, piped HTTP response occurs in real time.

13. The computer program product of claim 8, further causing the processor to perform a tuning action by:

determining the occurrence of the alert condition; and wherein:

the alert condition occurs when a threshold stored memory size of the search cluster is reached.

14. The computer program product of claim 8, further causing the processor to perform a tuning action by:

responsive to a completion of a pre-determined time period during which the collector operates according to the second configuration, returning the collector to the first configuration.

15. A computer system comprising:

a processor set; and a computer readable storage medium;

wherein:

the processor set is structured, located, connected, and/or programmed to run program instructions stored on the computer readable storage medium; and the program instructions which, when executed by the processor set, cause the processor set to perform a tuning action by:

responsive to an occurrence of an alert condition, generating a piped HTTP request for performing analytics on a first set of machine data in a search cluster, the first set of machine data collected by a collector according to a first configuration of the collector, the first configuration establishing default data collection levels;

receiving a single-threaded, piped HTTP response to the piped HTTP request as analytics output;

determining a second configuration for the collector to collect a second set of machine data responsive to the analytics output, the second configuration establishing debug data collection levels, wherein the debug data collection level causes a list of events to be monitored for data collection in addition to actions of the default data collection levels;

executing a sync instruction to the collector to replace the first configuration with the second configuration; and causing the collector to collect a second set of machine data by processing new machine data according to the second configuration, the new machine data generated after the occurrence of the alert condition;

wherein:

the second set of machine data includes event-specific data determined to be relevant by the performing analytics on the first set of machine data.

16. The computer system of claim 15, further causing the processor set to perform a tuning action by:

causing a sensor to record first machine data from a first enterprise component, the first machine data being processed by the collector to collect the first set of machine data.

17. The computer system of claim 16, further causing the processor set to perform a tuning action by:

responsive to the analytics output, adjusting a scope of data capture corresponding to recording machine data by causing the sensor to record the new machine data from the first enterprise component and a second enterprise component.

18. The computer system of claim 16, further causing the processor set to perform a tuning action by:

causing the collector to collect the first set of machine data by processing a portion of the recorded machine data according to the first configuration, the first collector programmed to distribute the first set of machine data to the search cluster.

19. The computer system of claim 15, further causing the processor set to perform a tuning action by:

the analytics output is produced by performing analytics on the first set of machine data in real time; and receiving the single-threaded, piped HTTP response occurs in real time.

20. The computer system of claim 15, further causing the processor set to perform a tuning action by:

determining the occurrence of the alert condition;

wherein:

the alert condition occurs when a threshold stored memory size of the search cluster is reached.

* * * * *